United States Patent
Sakai et al.

(10) Patent No.: US 10,845,129 B2
(45) Date of Patent: Nov. 24, 2020

(54) GEOTHERMAL HEAT UTILIZATION SYSTEM AND GEOTHERMAL HEAT UTILIZATION METHOD

(71) Applicants: MITSUBISHI HEAVY INDUSTRIES THERMAL SYSTEMS, LTD., Tokyo (JP); THE KANSAI ELECTRIC POWER CO., INC., Osaka (JP); OSAKA CITY UNIVERSITY, Osaka (JP); NEWJEC Inc., Osaka (JP)

(72) Inventors: Masanobu Sakai, Tokyo (JP); Takeshi Fuchimoto, Tokyo (JP); Rinnichi Sai, Tokyo (JP); Yasuhisa Nakaso, Osaka (JP); Shinsuke Sakae, Osaka (JP); Masaki Nakao, Osaka (JP); Masatoshi Nishioka, Osaka (JP); Kazuhiro Nakamura, Osaka (JP)

(73) Assignees: MITSUBISHI HEAVY INDUSTRIES THERMAL SYSTEMS, LTD., Tokyo (JP); THE KANSAI ELECTRIC POWER CO., INC., Osaka (JP); OSAKA CITY UNIVERSITY, Osaka (JP); NEWJEC INC., Osaka (JP)

( * ) Notice: Subject to any disclaimer, the term of this patent is extended or adjusted under 35 U.S.C. 154(b) by 147 days.

(21) Appl. No.: 15/934,104

(22) Filed: Mar. 23, 2018

(65) Prior Publication Data
US 2018/0283799 A1    Oct. 4, 2018

(30) Foreign Application Priority Data
Mar. 31, 2017    (JP) .................................. 2017-073207

(51) Int. Cl.
*F28D 20/00* (2006.01)
*F25B 25/00* (2006.01)
(Continued)

(52) U.S. Cl.
CPC .......... *F28D 20/0052* (2013.01); *F24F 11/30* (2018.01); *F24T 10/20* (2018.05);
(Continued)

(58) Field of Classification Search
CPC .......... F28D 20/0052; F28D 2020/006; F25D 17/00; F24T 10/20; F24T 50/00;
(Continued)

(56) References Cited

U.S. PATENT DOCUMENTS

2013/0014926 A1* 1/2013 Iyengar .............. H05K 7/20836
165/200

FOREIGN PATENT DOCUMENTS

CN    104864447 A  *  8/2015
EP    2 913 614 A2    9/2015
(Continued)

OTHER PUBLICATIONS

Cui Jiaxu, Comprehensive renewable energy cooling and heating system, Aug. 26, 2015, European Patent Office, English Translation (Year: 2015).*

(Continued)

*Primary Examiner* — Steve S Tanenbaum
(74) *Attorney, Agent, or Firm* — Birch, Stewart, Kolasch & Birch, LLP

(57) ABSTRACT

A geothermal heat utilization system includes a heat source well facility, a heat source device having a refrigeration cycle including a compressor, a condenser, an expanded portion, and an evaporator, a primary refrigerant circuit that is connected to a first unit which is one of the condenser and the evaporator of the heat source device, heat exchange being able to be performed between the first unit and the well-side pipe, a secondary refrigerant circuit that is connected to a second unit which is the other of the condenser and the evaporator of the heat source device, heat exchange (Continued)

being able to be performed between the second unit and a load, and a mode switching unit that switches between a cold heat storage operation mode in which the primary refrigerant circuit is connected to the evaporator and the secondary refrigerant circuit is connected to the condenser and a cold heat discharge operation mode in which the primary refrigerant circuit is connected to the condenser and the secondary refrigerant circuit is connected to the evaporator.

11 Claims, 10 Drawing Sheets

(51) Int. Cl.
    *F24T 10/20*     (2018.01)
    *F24F 11/30*     (2018.01)
    *F24T 50/00*     (2018.01)
    *F25D 17/00*     (2006.01)
    *F25B 30/06*     (2006.01)
    *F24F 5/00*     (2006.01)
    *F24T 10/00*     (2018.01)

(52) U.S. Cl.
    CPC ............ *F24T 50/00* (2018.05); *F25B 25/005* (2013.01); *F25D 17/00* (2013.01); *F24D 2200/11* (2013.01); *F24F 2005/0053* (2013.01); *F24T 2010/56* (2018.05); *F25B 30/06* (2013.01); *F25B 2339/047* (2013.01); *F28D 2020/006* (2013.01); *Y02B 10/40* (2013.01); *Y02E 10/10* (2013.01)

(58) Field of Classification Search
    CPC .......... F24F 2005/0053; F24D 2200/11; F25B 25/005; Y02E 10/10; Y02B 10/40
    USPC ........................................................... 62/260
    See application file for complete search history.

(56) References Cited

FOREIGN PATENT DOCUMENTS

| | | |
|---|---|---|
| JP | 58-11529 B | 3/1983 |
| JP | 61-119040 U | 7/1986 |
| JP | 63-25466 Y | 7/1988 |
| JP | 63025466 Y2 * | 7/1988 |
| JP | 6-26670 A | 2/1994 |
| JP | 2007-303695 A | 11/2007 |
| JP | 2015-161463 A | 9/2015 |

OTHER PUBLICATIONS

Certificate for Purpose of Seeking Application of Provision Concerning Exception to Lack of Novelty of Invention filed with Japanese Patent Application No. 2017-073207.

Document to be submitted for the certificate for the application of Exception to Lack of Novelty filed with Japanese Patent Application No. 2017-073207.

* cited by examiner (No.1)

(No. 2)

(No. 3)

(No. 4)

(No.5)

(No.6)

GEOTHERMAL HEAT UTILIZATION SYSTEM AND GEOTHERMAL HEAT UTILIZATION METHOD

BACKGROUND OF THE INVENTION

Field of the Invention

The present invention relates to a geothermal heat utilization system and a geothermal heat utilization method.

Priority is claimed on Japanese Patent Application No. 2017-073207, filed Mar. 31, 2017, the content of which is incorporated herein by reference.

Description of Related Art

In recent years, a geothermal heat utilization system in which groundwater in an aquifer is pumped up from a well and used as a hot heat source or a cold heat source has been proposed.

As a technology related to this, Patent Document 1 discloses a geothermal heat utilization system that uses groundwater pumped from a well as a heat source to cool and heat a facility via a heat exchanger. In the system disclosed in Patent Document 1, the pumped groundwater undergoes heat-exchange, is injected into another well, and then, returned to the basement again in order to take into account a balance in the amount of heat accumulated in a basement.

PATENT DOCUMENTS

[Patent Document 1] Japanese Unexamined Patent Application, First Publication No. 2015-161463

SUMMARY OF THE INVENTION

However, in the geothermal heat utilization system disclosed in Patent Document 1, a heat source device (a heat pump) for heating and using the groundwater in winter, and a heat exchanger for cooling and using the groundwater in summer are separately provided. Therefore, in order to calculate a balance in the amount of heat of the groundwater throughout a year, it is necessary to sum a balance in the amount of heat in the heat pump and a balance in the amount of heat in the heat exchanger, and management of the balance in the amount of heat of the groundwater throughout the year is complicated.

An object of the present invention is to provide a geothermal heat utilization system and a geothermal heat utilization method capable of easily managing the balance in the amount of heat of groundwater throughout the year.

A geothermal heat utilization system of a first aspect includes a heat source well facility including a hot water well, a cold water well, a well-side pipe that connects the wells, and a pump provided in the well-side pipe; a heat source device having a refrigeration cycle including a compression unit, a condenser, an expansion unit, and an evaporator; a primary refrigerant circuit that is connected to a first unit which is one of the condenser and the evaporator of the heat source device, heat exchange being able to be performed between the first unit and the well-side pipe; a secondary refrigerant circuit that is connected to a second unit which is the other of the condenser and the evaporator of the heat source device, heat exchange being able to be performed between the second unit and a load; and a mode switching unit that switches between a cold heat storage operation mode in which the primary refrigerant circuit is connected to the evaporator and the secondary refrigerant circuit is connected to the condenser and a cold heat discharge operation mode in which the primary refrigerant circuit is connected to the condenser and the secondary refrigerant circuit is connected to the evaporator.

According to this aspect, the geothermal heat utilization system switches connection between the primary refrigerant circuit and the secondary refrigerant circuit and the heat source device in relation to the cold heat storage operation mode and the cold heat discharge operation mode. Therefore, the geothermal heat utilization system can handle the cold heat storage operation mode and the cold heat discharge operation mode while using the same heat source device. Therefore, since the geothermal heat utilization system can manage the balance in the amount of groundwater heat throughout the year with the balance in the heat amount in the heat source device, it is possible to simply manage the balance in the amount of heat of the groundwater throughout the year.

The geothermal heat utilization system of a second aspect further includes a cooling tower, and a cooling tower-side refrigerant circuit connected to the cooling tower.

According to this aspect, the geothermal heat utilization system can store cold heat using the cooling tower. Therefore, in the geothermal heat utilization system, it is possible to perform cold heat storage operation from the cooling tower in the ground in the cold heat storage operation mode, in addition to the cold heat storage operation from the load in the ground. Further, in the geothermal heat utilization system, it is possible to perform a follow-up operation using a cooling tower, in addition to a cold heat discharge operation using geothermal heat, in the cold heat discharge operation mode.

In the geothermal heat utilization system of a third aspect, the mode switching unit switches the secondary refrigerant circuit to a first auxiliary refrigerant circuit in which heat exchange is able to be performed between the cooling tower-side refrigerant circuit and the condenser in the cold heat storage operation mode.

According to this aspect, by performing switching to the first auxiliary refrigerant circuit, the geothermal heat utilization system can discharge the exhaust heat of the primary refrigerant circuit capable of heat exchange with the well-side pipe to the cooling tower. Therefore, the geothermal heat utilization system can perform the cold heat storage operation from the cooling tower to the ground.

In the geothermal heat utilization system of a fourth aspect, the mode switching unit switches the primary refrigerant circuit and the secondary refrigerant circuit to a secondary auxiliary refrigerant circuit in which heat exchange is able to be performed between the cooling tower-side refrigerant circuit and the well-side pipe in the cold heat storage operation mode.

According to this aspect, by performing switching to the second auxiliary refrigerant circuit, the geothermal heat utilization system can supply the cold heat obtained from the cooling tower to the well-side pipe. Therefore, the geothermal heat utilization system can perform the cold heat storage operation from the cooling tower to the ground.

The geothermal heat utilization system of a fifth aspect further includes an injected water thermometer that is provided in the well-side pipe and detects a temperature of water injected into the cold water well; an outside air thermometer that detects an outside air temperature; and a mode determination unit that compares the outside air temperature with the injected water temperature, wherein when the mode determination unit determines that the outside air temperature is lower than the injected water temperature, the mode switching unit performs switching to the second auxiliary refrigerant circuit.

According to this aspect, when the outside air temperature is lower than the injected water temperature, the geothermal heat utilization system performs switching to the second auxiliary refrigerant circuit. Therefore, the geothermal heat utilization system can efficiently store cold heat from the outside air in the ground.

In the geothermal heat utilization system of a sixth aspect, the mode switching unit connects the secondary refrigerant circuit to the evaporator in the cold heat discharge operation mode, and performs switching to a first expanded refrigerant circuit in which heat exchange is able to be performed between the evaporator, the load, and the well-side pipe upstream of a location of heat exchange with the primary refrigerant circuit.

According to this aspect, the geothermal heat utilization system performs heat exchange between the pumped water of the cold water well and the returned refrigerant from the load by performing switching to the first expanded refrigerant circuit. Therefore, the geothermal heat utilization system can cool the returned refrigerant from the load using the pumped water of the cold water well before the refrigerant is cooled with the heat source device. Therefore, the geothermal heat utilization system can directly use the cold heat of the pumped water of the cold water well.

The geothermal heat utilization system of a seventh aspect further includes a pumped water thermometer that is provided in the well-side pipe and detects a temperature of pumped water from the cold water well; a load downstream side thermometer that is provided downstream of the load and detects a temperature of a returned refrigerant from the load; and a mode determination unit that compares the return refrigerant temperature with the pumped water temperature, wherein the mode switching unit performs switching to the first expanded refrigerant circuit when the mode determination unit determines that the returned refrigerant temperature is higher than the pumped water temperature.

According to this aspect, when the temperature of the returned refrigerant from the load is higher than the temperature of the pumped water, the geothermal heat utilization system performs switching to the first expanded refrigerant circuit. Therefore, since the geothermal heat utilization system performs switching to the first expanded refrigerant circuit when the cold heat of the pumped water of the cold water well can be directly used, it is possible to efficiently use the cold heat of the pumped water of the cold water well.

In the geothermal heat utilization system of an eighth aspect, the mode switching unit in the cold heat discharge operation mode connects the secondary refrigerant circuit to the evaporator, and performs switching to a second expanded refrigerant circuit in which heat exchange is able to be performed between the evaporator, the load, and the well-side pipe, and switches the primary refrigerant circuit to a first auxiliary refrigerant circuit in which heat exchange is able to be performed between the cooling tower-side refrigerant circuit and the condenser.

According to this aspect, the geothermal heat utilization system performs heat exchange between the pumped water of the cold water well and the returned refrigerant from the load by performing switching to the second expanded refrigerant circuit and the first auxiliary refrigerant circuit. Therefore, the geothermal heat utilization system can cool the returned refrigerant from the load with the pumped water of the cold water well before the refrigerant is cooled with the heat source device. Further, the geothermal heat utilization system can cool the returned refrigerant from the load through the cooling follow-up operation using the heat source device. Therefore, in the geothermal heat utilization system, since direct cooling using the pumped water of the cold water well and follow-up cooling using the heat source device can be used in series, it is possible to cool the returned refrigerant from the load to the temperature required for the load.

The geothermal heat utilization system according to a ninth aspect of the present invention further includes an injected water thermometer that is provided in the well-side pipe and detects a temperature of water injected into the hot water well; a load downstream side thermometer that is provided downstream of the load and detects a returned refrigerant temperature of a refrigerant returning from the load; and a mode determination unit that compares the returned refrigerant temperature with the injected water temperature, wherein the mode determination unit performs switching to the second expanded refrigerant circuit and performs switching to the first auxiliary refrigerant circuit when the mode determination unit determines that the returned refrigerant temperature is higher than the injected water temperature.

According to this aspect, when the temperature of the returned refrigerant from the load is higher than the temperature of the injected water, the geothermal heat utilization system performs switching to the second expanded refrigerant circuit and the first auxiliary refrigerant circuit. Thus, since the geothermal heat utilization system performs switching to the second expanded refrigerant circuit and the first auxiliary refrigerant circuit when the cooling follow-up operation using the heat source device is required, it is possible to efficiently use the cooling follow-up operation using the heat source device.

A method of using geothermal heat according to a tenth aspect of the present invention performs: an operation mode selection step of selecting an operation mode of a geothermal heat utilization system as a cold heat storage operation mode or a cold heat discharge operation mode, the geothermal heat utilization system including a heat source well facility including a hot water well, a cold water well, a well-side pipe that connects the wells, and a pump provided in the well-side pipe, a heat source device having a refrigeration cycle including a compression unit, a condenser, an expansion unit, and an evaporator, a primary refrigerant circuit that is connected to a first unit which is one of the condenser and the evaporator of the heat source device, heat exchange being able to be performed between the first unit and the well-side pipe, and a secondary refrigerant circuit that is connected to a second unit which is the other of the condenser and the evaporator of the heat source device, heat exchange being able to be performed between the second unit and a load; a cold heat storage operation mode switching step of connecting the primary refrigerant circuit to the evaporator and connecting the secondary refrigerant circuit to the condenser when the cold heat storage operation mode is selected; and a cold heat discharge operation mode switching step of connecting the primary refrigerant circuit to the condenser and connecting the secondary refrigerant circuit to the evaporator when the cold heat discharge operation mode is selected.

According to this aspect, in the geothermal heat utilization method, the connection between the primary refrigerant circuit and the secondary refrigerant circuit and the heat source device is switched in relation to the selection between the cold heat storage operation mode and the cold heat discharge operation mode. Therefore, in the geothermal heat utilization method, it is possible to cope with the cold heat storage operation mode and the cold heat discharge operation mode while using the same heat source device. Therefore, in the geothermal heat utilization method, since it is possible to manage a balance in the amount of heat of the groundwater throughout the year with a balance in the amount of heat in the heat source device, it is possible to simply manage the balance in the amount of heat of the groundwater throughout the year.

According to one aspect described above, it is possible to easily manage the balance in the amount of heat of the groundwater throughout the year.

DETAILED DESCRIPTION OF THE INVENTION

Hereinafter, various embodiments of the present invention will be described with reference to the drawings.

EMBODIMENTS

Embodiments of the geothermal heat utilization system according to the present invention will be described with reference to FIGS. 1 to 8.
(Configuration of Geothermal Heat Utilization System)

Figure 1:
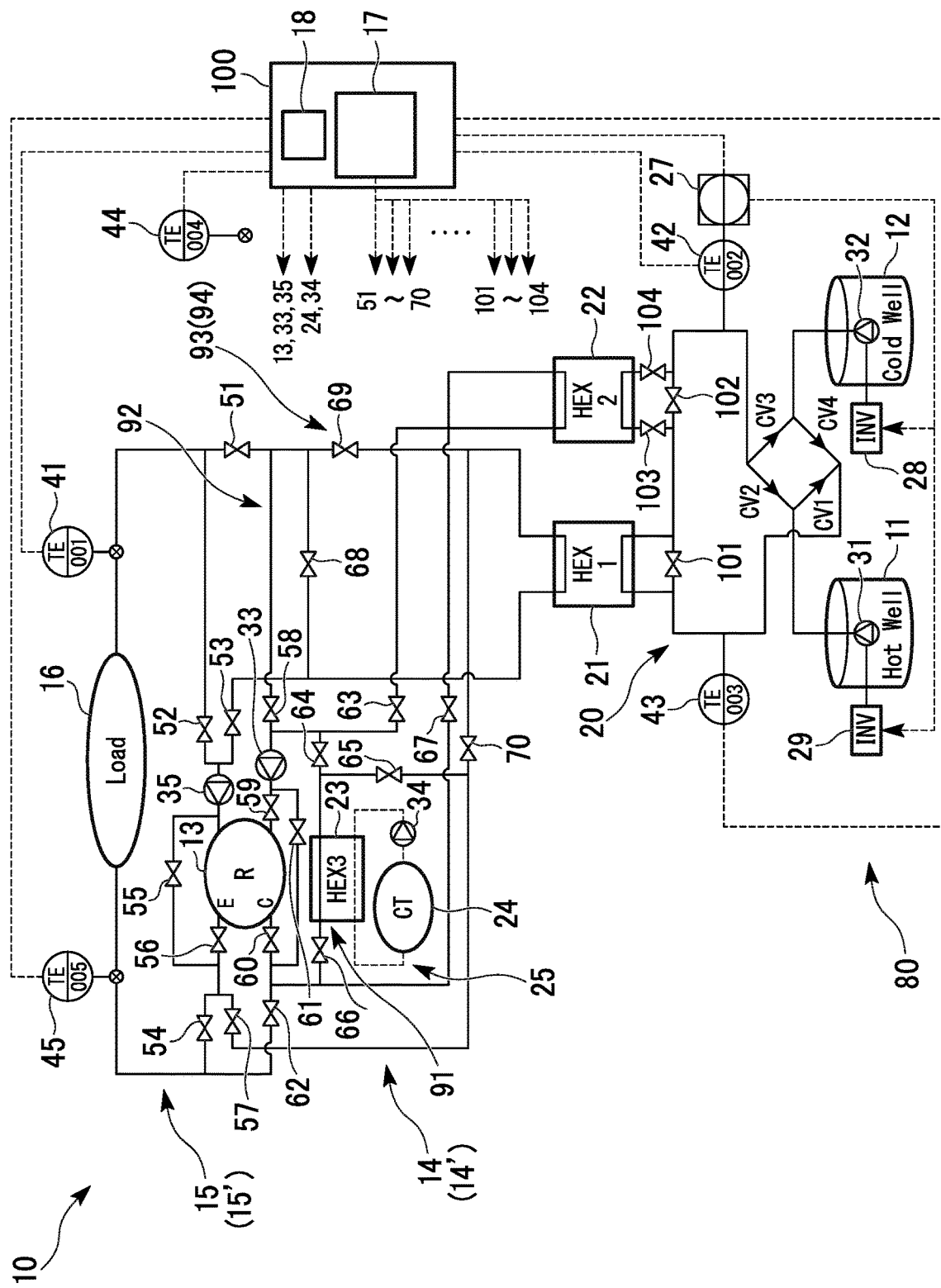
FIG. 1 is an overall system diagram of a geothermal heat utilization system in an embodiment of the present invention.

As illustrated in FIG. 1, a geothermal heat utilization system 10 includes a heat source well facility 80, a heat source device 13, an auxiliary heat exchanger 23, a cooling tower 24, pumps 33 to 35, opening and closing valves 51 to 70, and central control unit 100 including a mode switching unit 17 and a mode determination unit 18.

In the embodiment, a computer of the central control unit 100 is caused to function as the mode switching unit 17 and the mode determination unit 18 by executing a program to be described below.

The geothermal heat utilization system 10 is connected to a load 16. The load 16 is a heating load or a cooling load. For example, the load 16 mainly serves as a heating load in a winter season, and mainly serves as a cooling load in summer.

The geothermal heat utilization system 10 is mainly operated in a cold heat storage operation mode in the winter season and stores cold heat in the heat source well facility 80.

Further, the geothermal heat utilization system 10 is mainly operated in the cold heat discharge operation mode in summer, and discharges the cold heat of the heat source well facility 80.

Further, the geothermal heat utilization system 10 includes a primary refrigerant circuit 14 (or 14') formed of each opening and closing valve and each pump, a secondary refrigerant circuit 15 (or 15'), a first auxiliary refrigerant circuit 91, a second auxiliary refrigerant circuit 92, a first expanded refrigerant circuit 93, and a second expanded refrigerant circuit 94.
(Configuration of Mode Switching Unit and Central Control Unit)

The mode switching unit 17 is connected to each opening and closing valve so that a control signal can be transmitted. In connection with an operation mode, the mode switching unit 17 controls the opening and closing of the opening and closing valves so that at least one of the primary refrigerant circuit 14 (or 14'), the secondary refrigerant circuit 15 (or 15'), the first auxiliary refrigerant circuit 91, the second auxiliary refrigerant circuit 92, the first expanded refrigerant circuit 93, and the second expanded refrigerant circuit 94 is operated.

The central control unit 100 receives temperature (information) detected by each thermometer to be described below. The central control unit 100 controls the heat source device 13, the cooling tower 24, the pumps 33 to 35, the cooling tower 24, and a well facility control unit 27 to be described below.
(Configuration of Heat Source Device)

The heat source device 13 includes a refrigeration cycle including a compression unit, a condenser C, an expansion unit, and an evaporator E. The heat source device 13 heats a refrigerant of one refrigerant circuit connected to the condenser C of the heat source device 13 from the outside of the heat source device 13 using the condenser C, and also cools the refrigerant of another refrigerant circuit connected to the evaporator E of the heat source device 13 from the outside of the heat source device 13.
(Configuration of Heat Source Well Facility)

The heat source well facility 80 includes a hot water well 11, a cold water well 12, and a well-side pipe 20 connecting the hot water well 11 to the cold water well 12, The heat source well facility 80 includes a pump 31 in the hot water well 11, a pump control unit 29 that controls an output of the pump 31, a pump 32 in the cold water well 12, and a pump control unit 28 that controls an output of the pump 32.

The pump 31 is provided at one end, and the pump 32 is provided at the other end of the two ends of the well-side pipe 20. The heat source well facility 80 pumps the water stored in the hot water well 11 to the well-side pipe 20 using the pump 31 and injects the pumped water into the cold water well 12. Similarly, the heat source well facility 80 pumps the water stored in the cold water well 12 to the well-side pipe 20 using the pump 32 and injects the pumped water into the hot water well 11.

The heat source well facility 80 further includes check valves CV1 to CV4, an upstream heat exchanger 21, a downstream heat exchanger 22, a pumped water thermometer 43, an injected water thermometer 42, a well facility control unit 27, and opening and closing valves 101 to 104.

One side of the upstream heat exchanger 21 and one side of the downstream heat exchangers 22 are connected in series to the well-side pipe 20 in the middle of the well-side pipe 20.

The other side of the upstream heat exchanger 21 is connected to various refrigerant circuits to be described below. Therefore, the upstream heat exchanger 21 performs heat exchange between the water in the well-side pipe 20 and the refrigerant flowing in the various refrigerant circuits.

Similarly, the other side of the downstream heat exchanger 22 is connected to various refrigerant circuits to be described below, and performs heat exchange between the water in the well-side pipe 20 and the refrigerant flowing in the various refrigerant circuits.

The opening and closing valve 101 is connected in parallel to one side of the upstream heat exchanger 21. When the opening and closing valve 101 is closed, the water pumped to the well-side pipe 20 passes through one side of the upstream heat exchanger 21 and exchanges heat with the refrigerant flowing in the various refrigerant circuits. When the opening and closing valve 101 is open, the water pumped to the well-side pipe 20 passes through the opening and closing valve 101, does not pass through one side of the upstream heat exchanger 21, and does not heat exchange with the refrigerant flowing in the various refrigerant circuits.

The opening and closing valve 102 is connected in parallel to one side of the downstream heat exchanger 22. The opening and closing valve 103 and the opening and closing valve 104 are connected in series upstream and downstream of one side of the downstream heat exchanger 22, respectively. When the opening and closing valve 102 is closed and the opening and closing valve 103 and the opening and closing valve 104 are open, the water pumped up to the well-side pipe 20 passes through one side of the downstream heat exchanger 22, and exchanges heat with the refrigerant flowing in the various refrigerant circuits. When the opening and closing valve 102 is open and the opening and closing valve 103 and the opening and closing valve 104 are closed, the water pumped up to the well-side pipe 20 passes through the opening and closing valve 102, does not pass through one side of the downstream heat exchanger 22, and does not exchange heat with the refrigerant flowing in the various refrigerant circuits.

Note that regarding the upstream heat exchanger 21, opening and closing valves may be provided in series upstream and downstream of one side of the upstream heat exchanger 21, similar to the downstream heat exchanger 22. On the other hand, regarding the downstream heat exchanger 22, the opening and closing valve 103 and the opening and closing valve 104 may not be provided, similar to the upstream heat exchanger 21.

The check valves CV1 to CV4 are connection circuits as illustrated in FIG. 1, and are connected to the well-side pipe 20 in the middle of the well-side pipe 20. The check valves CV1 to CV4 rectify a flow of water in the well-side pipe 20 so that the water in the well-side pipe 20 flows from the upstream heat exchanger 21 (or the opening and closing valve 101) to the downstream heat exchanger 22 (or the opening and closing valve 102). Therefore, irrespective of whether water is pumped up from the hot water well 11 or the cold water well 12, the water in the well-side pipe 20 flows from the upstream heat exchanger 21 (or the opening and closing valve 101) to the downstream heat exchanger 22 (or the opening and closing valve 102). Here, each of the check valves CV1 to CV4 illustrated in FIG. 1 allows water to flow in a direction indicated by an arrow and does not allow water to flow in a direction opposite to the arrow.

For example, when water is pumped up from the hot water well 11, the water in the well-side pipe 20 is injected from the hot water well 11 into the cold water well 12 through the check valve CV1, the upstream heat exchanger 21 (or the opening and closing valve 101), the downstream heat exchanger 22 (or the opening and closing valve 102), and the check valve CV3 in this order. In this case, since the pressure in the well-side pipe 20 is higher on the upstream side (the hot water well 11 side) from the heat exchanger than on the downstream side, water does not flow through the check valve CV2 or the check valve CV4.

Similarly, when water is pumped up from the cold water well 12, the water in the well-side pipe 20 is injected from the cold water well 12 into the hot water well 11 through the check valve CV4, the upstream heat exchanger 21 (or the opening and closing valve 101), the downstream heat exchanger 22 (or the opening and closing valve 102), and the check valve CV2 in this order. In this case, since the pressure in the well-side pipe 20 is higher on the upstream side (the hot water well 11 side) from the heat exchanger than on the downstream side, water does not flow through the check valve CV1 and the check valve CV3.

The well facility control unit 27 is communicatively connected to the pump control unit 28, the pump control unit 29, and the injected water thermometer 42.

The well facility control unit 27 transmits a command to the pump control unit 29 and the pump control unit 28 to control respective outputs of the pump 31 and the pump 32.

The pump control unit 28 controls the output of the pump 32 by controlling an inverter frequency of the pump 32. Similarly, the pump control unit 29 controls the output of the pump 31 by controlling an inverter frequency of the pump 31.

The injected water thermometer 42 is provided in the well-side pipe 20 downstream of the downstream heat exchanger 22 and detects the temperature of the water that is injected into the hot water well 11 or the cold water well 12. In the embodiment, as illustrated in FIG. 1, the injected water thermometer 42 is provided in the well-side pipe 20 between the downstream heat exchanger 22, the check valve CV2, and the check valve CV3.

The pumped water thermometer 43 is provided in the well-side pipe 20 upstream of the upstream heat exchanger 21 and detects the temperature of the water (pumped water) pumped up from the hot water well 11 or the cold water well 12. In the embodiment, as illustrated in FIG. 1, the pumped water thermometer 43 is provided in the well-side pipe 20 between the upstream heat exchanger 21, the check valve CV1, and the check valve CV4.

The injected water thermometer 42 and the pumped water thermometer 43 detect the injected water temperature TE-002 and the pumped water temperature TE-003, respectively.

(Configuration of Cooling Tower and Surroundings Thereof)

The geothermal heat utilization system 10 further includes an auxiliary heat exchanger 23 and a cooling tower-side refrigerant circuit 25, in addition to the cooling tower 24. The cooling tower-side refrigerant circuit 25 is connected to the auxiliary heat exchanger 23 and the cooling tower 24. The cooling tower-side refrigerant circuit 25 is a circuit that sequentially passes through the auxiliary heat exchanger 23, the cooling tower 24, and the pump 34 from the pump 34. Accordingly, in the cooling tower-side refrigerant circuit 25, heat exchange can be performed between the cooling tower 24 and the auxiliary heat exchanger 23 using the refrigerant circulated in the circuit. The cooling tower 24 performs heat exchange with outside air.

(Configuration of Primary Refrigerant Circuit and Surroundings Thereof)

The primary refrigerant circuit is a circuit connected to either the condenser C or the evaporator E of the heat source device 13.

The primary refrigerant circuit 14 formed in the cold heat storage operation mode is a circuit that passes through the evaporator E of the heat source device 13, the opening and closing valve 56, the opening and closing valve 57, the opening and closing valve 70, the upstream heat exchanger 21, the opening and closing valve 53, and a pump 35 in this order from the pump 35. Therefore, in the primary refrigerant circuit 14, heat exchange can be performed between the evaporator E of the heat source device 13 and the upstream heat exchanger 21 using the refrigerant circulated in the circuit.

The primary refrigerant circuit 14' formed in a cold heat discharge operation mode is a circuit that passes through the opening and closing valve 59, the condenser C of the heat source device 13, the opening and closing valve 60, the opening and closing valve 67, the downstream heat exchanger 22, the opening and closing valve 63, and the pump 33 in this order from the pump 33. Therefore, in the primary refrigerant circuit 14', heat exchange can be performed between the condenser C of the heat source device 13 and the downstream heat exchanger 22 using the refrigerant circulated in the circuit.

(Configuration of Secondary Refrigerant Circuit and Surroundings Thereof)

The secondary refrigerant circuit is a circuit connected to either the condenser C or the evaporator E of the heat source device 13.

The secondary refrigerant circuit 15 formed in the cold heat storage operation mode is a circuit that passes through the opening and closing valve 59, the condenser C of the heat source device 13, the opening and closing valve 60, the opening and closing valve 62, the load 16, the opening and closing valve 51, the opening and closing valve 58, and the pump 33 in this order from the pump 33. Therefore, in the secondary refrigerant circuit 15, heat exchange can be performed between the condenser C of the heat source device 13 and the load 16 using the refrigerant circulated in the circuit.

The secondary refrigerant circuit 15' formed in the cold heat discharge operation mode is a circuit that passes through the evaporator E of the heat source device 13, the opening and closing valve 56, the opening and closing valve 54, the load 16, the opening and closing valve 52, and the pump 35 in this order from the pump 35. Therefore, in the secondary refrigerant circuit 15', heat exchange can be performed between the evaporator E of the heat source device 13 and the load 16 using the refrigerant circulated in the circuit.

In the embodiment, the primary refrigerant circuit 14, the primary refrigerant circuit 14', the secondary refrigerant circuit 15, and the secondary refrigerant circuit 15' may share any one of the pump 33, the pump 35, the opening and closing valve 56, the opening and closing valve 59, and the opening and closing valve 60. As a modification example, the primary refrigerant circuit 14, the primary refrigerant circuit 14', the secondary refrigerant circuit 15, and the secondary refrigerant circuit 15' individually include the pump 33, the pump 35, the opening and closing valve 56, the opening and closing valve 59, and the opening and closing valve 60.

(Configuration of First Auxiliary Refrigerant Circuit and Surroundings Thereof)

The first auxiliary refrigerant circuit 91 is a circuit that passes through the opening and closing valve 59, the condenser C of the heat source device 13, the opening and closing valve 60, the opening and closing valve 66, the auxiliary heat exchanger 23, the opening and closing valve 64, and the pump 33 in this order from the pump 33. Therefore, in the first auxiliary refrigerant circuit 91, heat exchange can be performed between the condenser C of the heat source device 13 and the auxiliary heat exchanger 23 using the refrigerant circulated in the circuit.

(Configuration of Second Auxiliary Refrigerant Circuit and Surroundings Thereof)

The second auxiliary refrigerant circuit 92 is a circuit that passes through the opening and closing valve 61, the opening and closing valve 66, the auxiliary heat exchanger 23, the opening and closing valve 65, the opening and closing valve 70, the upstream heat exchanger 21, the opening and closing valve 68, the opening and closing valve 58, and the pump 33 in this order from the pump 33. Therefore, in the second auxiliary refrigerant circuit 92, heat exchange can be performed between the auxiliary heat exchanger 23 and the upstream heat exchanger 21 using the circulated refrigerant.

(Configuration of First Expanded Refrigerant Circuit and Surroundings Thereof)

The first expanded refrigerant circuit 93 is a circuit that is connected to the evaporator E of the heat source device 13 and passes through the evaporator E of the heat source device 13, the opening and closing valve 56, the opening and closing valve 54, the load 16, the opening and closing valve 51, the opening and closing valve 69, the upstream heat exchanger 21, the opening and closing valve 53, and the pump 35 in this order from the pump 35. Therefore, in the first expanded refrigerant circuit 93, heat exchange can be performed between the evaporator E of the heat source device 13, the load 16, and the upstream heat exchanger 21 using the circulated refrigerant.

(Configuration of Second Expanded Refrigerant Circuit and Surroundings Thereof)

The second expanded refrigerant circuit 94 is the same as the first expanded refrigerant circuit 93. Further, the second expanded refrigerant circuit 94 can be a circuit that passes through the opening and closing valve 55 by means of the opening and closing valve 55 being connected in parallel to the evaporator E of the heat source device 13.

The primary refrigerant circuit, the secondary refrigerant circuit, the first auxiliary refrigerant circuit 91, the second auxiliary refrigerant circuit 92, the first expanded refrigerant circuit 93, and the second expanded refrigerant circuit 94 may share any one of the respective circuit components including each of the pumps and each of the opening and closing valves, similar to a relationship between the primary refrigerant circuit and the secondary refrigerant circuit described above. As a modification example, the primary refrigerant circuit, the secondary refrigerant circuit, the first auxiliary refrigerant circuit 91, the second auxiliary refrigerant circuit 92, the first expanded refrigerant circuit 93, and the second expanded refrigerant circuit 94 individually have the respective circuit components.

(Configuration of Other Thermometers)

The geothermal heat utilization system 10 further includes a load downstream side thermometer 41 that is provided downstream of the load 16 and detects a returned refrigerant temperature TE-001 with respect to the load 16, an load upstream side thermometer 45 that is provided upstream of the load 16 and detects an input refrigerant temperature TE-005 of an input refrigerant that enters the load 16, and an outside air thermometer 44 that detects an outside air temperature TE-004.

In the embodiment, as illustrated in FIG. 1, the load downstream side thermometer 41 is provided in the refrigerant circuit between the load 16 and the opening and closing valves 51 and 52, and the load upstream side thermometer 45 is provided in the refrigerant circuit between the load 16 and the opening and closing valve 54 and 62.

The load downstream side thermometer 41, the load upstream side thermometer 45, and the outside air thermometer 44 are communicatively connected to the central control unit 100, and transmit the detected returned refrigerant temperature TE-001, the detected input refrigerant temperature TE-005, and the detected outside air temperature TE-004 as temperature information to the central control unit 100.

(Function and Control of Geothermal Heat Utilization System)

Figure 2:
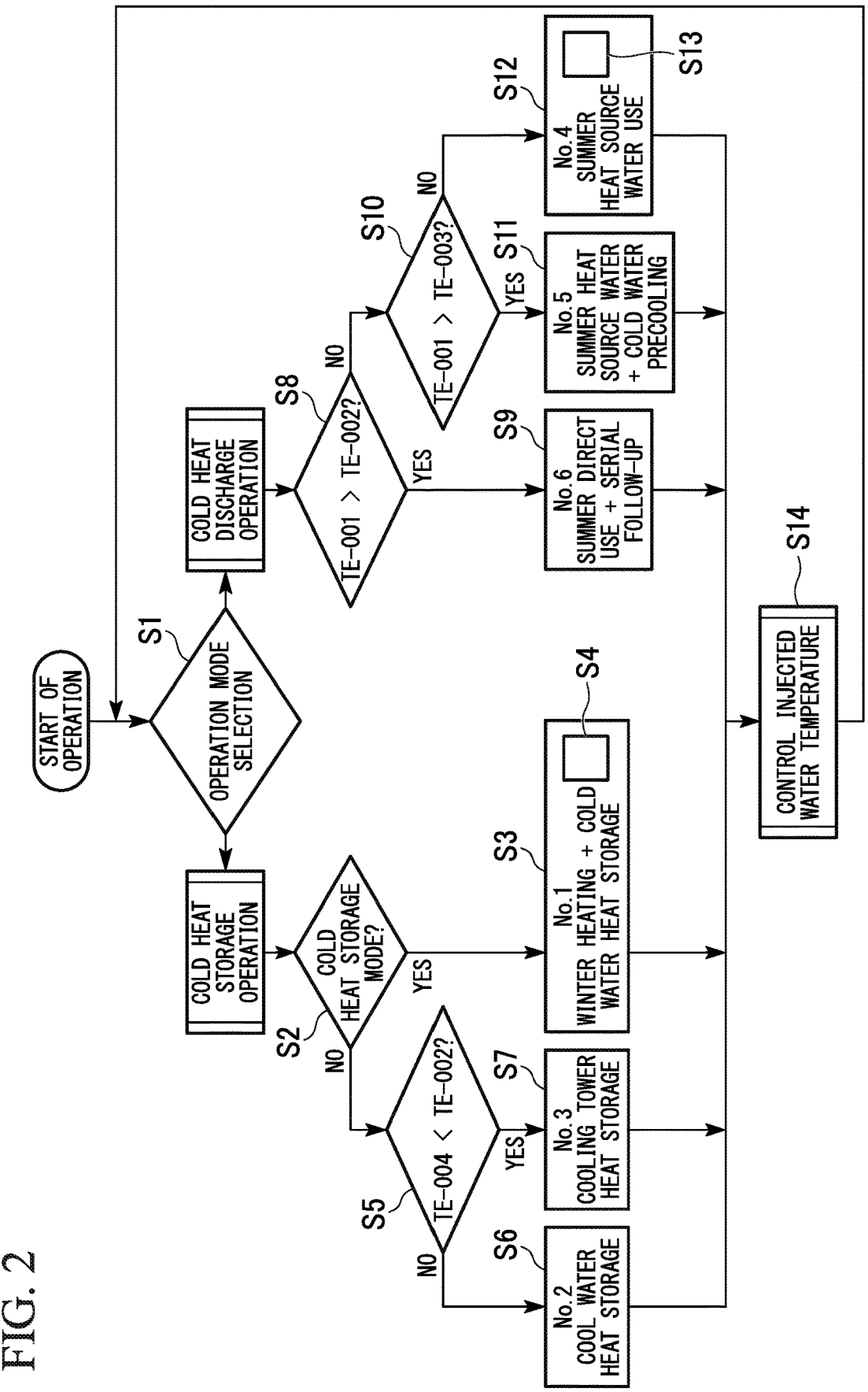
FIG. 2 is a flowchart of a method of using geothermal heat in an embodiment of the present invention.

As illustrated in FIG. 2, the geothermal heat utilization system 10 implements the selected operation mode. The operation mode may be automatically selected from a season, a time period, any of detected temperatures, or the like by the central control unit 100 or may be selected by the user.

When the user selects the operation mode, the central control unit 100 receives each operation mode selected by the user, so that the geothermal heat utilization system 10 implements each operation mode selected by the user.

As the operation mode implemented by the geothermal heat utilization system 10, any one of operation modes (No. 1 to No. 3) in the cold heat storage operation mode and operation modes (No. 4 to No. 6) for the cold heat discharge operation mode is implemented.

As the cold heat storage operation mode, a "winter heating+cold water heat storage mode (No. 1)", a "cold water heat storage mode (No. 2)", and a "cooling tower heat storage mode (No. 3)" are provided.

As the cold heat discharge operation mode, a "summer heat source water use mode (No. 4)", a "summer heat source water+cold water precooling mode (No. 5)", and a "direct use in summer+serial follow-up (No. 6)" are provided.

In the cold heat storage operation mode, three types of operation mode such as No. 1 to No. 3 may be set for an operation pattern for storing cold heat in the heat source well facility 80. Selection between the three types of operation modes is based on the fact that the three factors "use temperature difference", "integrated amount of heat", and "flow rate of groundwater" are balanced and an environmental impact is minimized even in a long-term operation.

A function and a control of each operation mode of the cold heat storage operation will be described below.

(No. 1: Winter Heating+Cold Water Heat Storage Mode)

The winter heating+cold water heat storage mode is a basic operation mode mainly for when the load 16 is heated in the winter.

This operation mode is an operation mode in which the primary refrigerant circuit 14 stories the cold heat received from the load 16 in the cold water well 12 while performing heating using exhaust heat of the primary refrigerant circuit 14 as the hot heat for heating of the load 16. Winter is assumed as the operation time.

Figure 3:
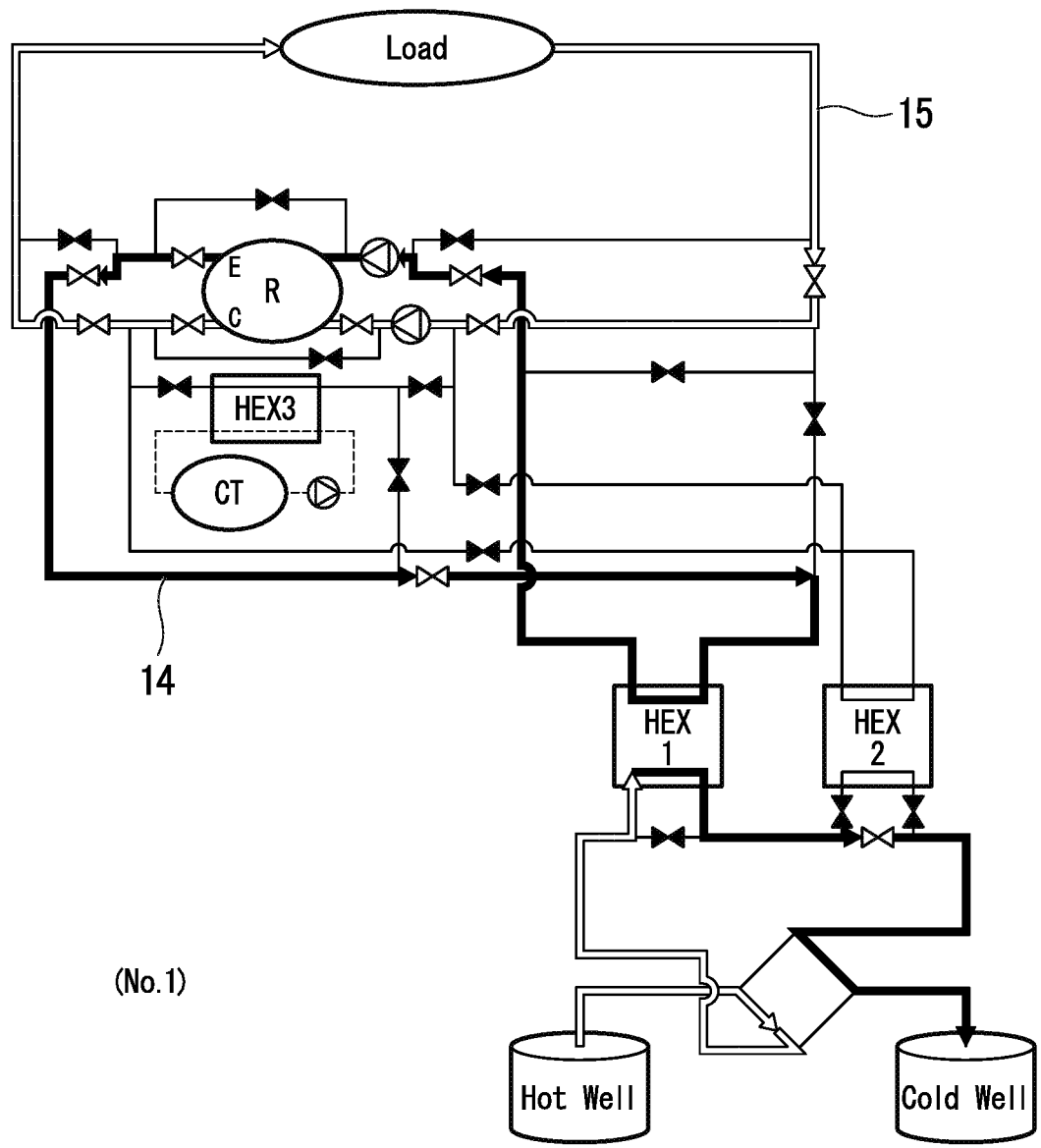
FIG. 3 is a diagram illustrating a circuit in a winter heating+cold water heat storage mode (No. 1).

In this operation mode, as illustrated in FIG. 3, the primary refrigerant circuit 14 and the secondary refrigerant circuit 15 are formed. Specifically, this is as follows.

When the winter heating+cold water heat storage mode (No. 1) is selected, the central control unit 100 controls each opening and closing valve and each pump, and forms the primary refrigerant circuit 14 and the secondary refrigerant circuit 15 in this operation mode. The central control unit 100 operates the heat source device 13.

Regarding the primary refrigerant circuit 14, the central control unit 100 operates the pump 35 and opens the opening and closing valves 56, 57, 70, and 53 to form the primary refrigerant circuit 14 through which the refrigerant circulates. Accordingly, the refrigerant in the primary refrigerant circuit 14 in this operation mode circulates through the pump 35, the evaporator E of the heat source device 13, the opening and closing valve 56, the opening and closing valve 57, the opening and closing valve 70, the upstream heat exchanger 21, the opening and closing valve 53, and the pump 35 in this order.

Regarding the heat source well facility 80, the central control unit 100 closes the opening and closing valves 101, 103, and 104, opens the opening and closing valve 102, and performs control so that pumped water of the hot water well 11 passes through the upstream heat exchanger 21 and the opening and closing valve 102 in this order and is injected into the cold water well 12.

Regarding the secondary refrigerant circuit 15, the central control unit 100 operates the pump 33 and opens the opening and closing valves 59, 60, 62, 51, and 58 to form the secondary refrigerant circuit 15 through which the refrigerant circulates. Accordingly, the refrigerant in the secondary refrigerant circuit 15 in this operation mode circulates through the pump 33, the opening and closing valve 59, the condenser C of the heat source device 13, the opening and closing valve 60, the opening and closing valve 62, the load 16, the opening and closing valve 51, the opening and closing valve 58, and the pump 33 in this order.

Therefore, in the primary refrigerant circuit 14 of this operation mode, heat exchange can be performed between the evaporator E of the heat source device 13 and the well-side pipe 20.

Further, in the secondary refrigerant circuit 15 in this operation mode, heat exchange can be performed between the condenser C of the heat source device 13 and the load 16.

Note that in this operation mode, the central control unit 100 closes the opening and closing valves 52, 54, 55, 61, and 63 to 69.

(No. 2: Cold Water Heat Storage Mode)

The cold water heat storage mode is a mode in which the primary refrigerant circuit 14 receives the cold heat from the cooling tower 24 and stores the cold heat in the cold water well 12, and on the other hand discharges exhaust heat to the cooling tower 24.

When the hot water load is smaller than the cold heat load throughout the year, the amount of cold heat stored in the cold water well 12 is insufficient, for example, in the summer only in the winter heating+cold water heat storage mode (No. 1). Therefore, by implementing this operation mode in the winter, a balance in the amount of heat storage in the groundwater throughout the year is maintained. Although the operation period is assumed to be a summer nighttime or an intermediate period between summer and winter, the operation period may be winter, if necessary.

Figure 4:
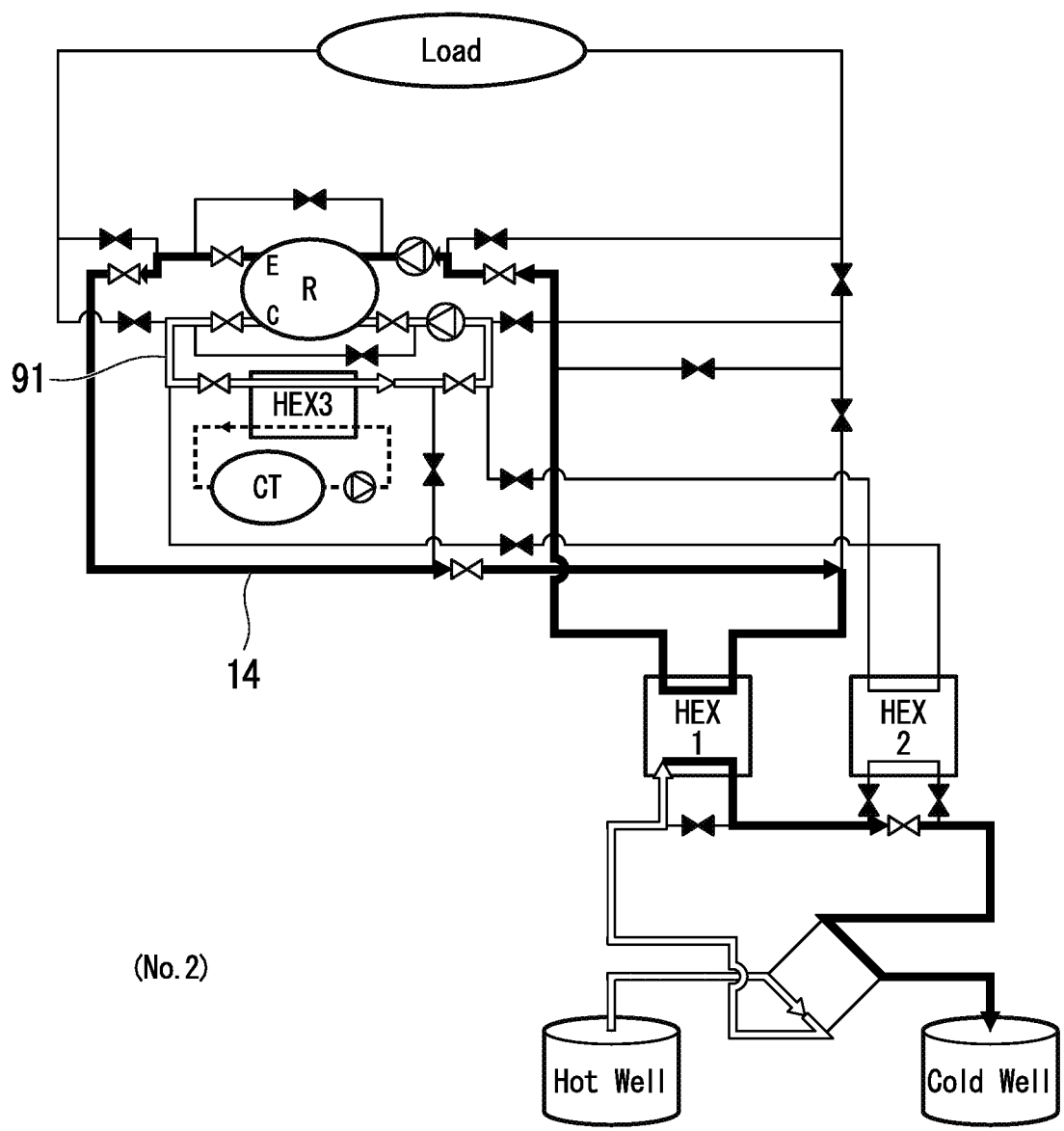
FIG. 4 is a diagram illustrating a circuit of cold water heat storage mode (No. 2).

In this operation mode, as illustrated in FIG. 4, the primary refrigerant circuit 14 and the first auxiliary refrigerant circuit 91 are formed. Specifically, this is as follows.

When the cold water heat storage mode (No. 2) is selected, the central control unit 100 controls each opening and closing valve and each pump and forms the primary refrigerant circuit 14 and the first auxiliary refrigerant circuit 91 in this operation mode. The central control unit 100 operates the heat source device 13.

Regarding the first auxiliary refrigerant circuit 91, the central control unit 100 operates the pump 33 and opens the opening and closing valves 59, 60, 66, and 64 to form the first auxiliary refrigerant circuit 91 through which the refrigerant circulates. Accordingly, the refrigerant in the first auxiliary refrigerant circuit 91 in this operation mode circulates through the pump 33, the opening and closing valve 59, the condenser C of the heat source device 13, the opening and closing valve 60, the opening and closing valve 66, the auxiliary heat exchanger 23, the opening and closing valve 64, and the pump 33 in this order.

Regarding the cooling tower 24, the central control unit 100 operates the cooling tower 24 and the pump 34.

Regarding the primary refrigerant circuit 14 and the heat source well facility 80, the central control unit 100 performs the same control as in the winter heating+cold water heat storage mode (No. 1).

Therefore, in the first auxiliary refrigerant circuit 91 in this operation mode, heat exchange can be performed between the condenser C of the heat source device 13 and the cooling tower 24. Further, in the primary refrigerant circuit 14 in this operation mode, heat exchange can be performed between the evaporator E of the heat source device 13 and the well-side pipe 20.

Note that in this operation mode, the central control unit 100 closes the opening and closing valves 51, 52, 54, 55, 58, 61, 62, 63, 65, and 67 to 69.

(No. 3: Cooling Tower Heat Storage Mode)

The cooling tower heat storage mode is an operation mode in which the cold heat received by the second auxiliary refrigerant circuit 92 without passing through the heat source device 13 from the cooling tower 24 is stored in the cold water well 12.

When the outside air temperature is sufficiently low and cold water below a low temperature-side required temperature of the system can be obtained by the cooling tower 24, a heat storage operation is performed using the cold water of the cooling tower. An operation period is assumed to be winter nighttime or an intermediate period between summer and winter.

Figure 5:
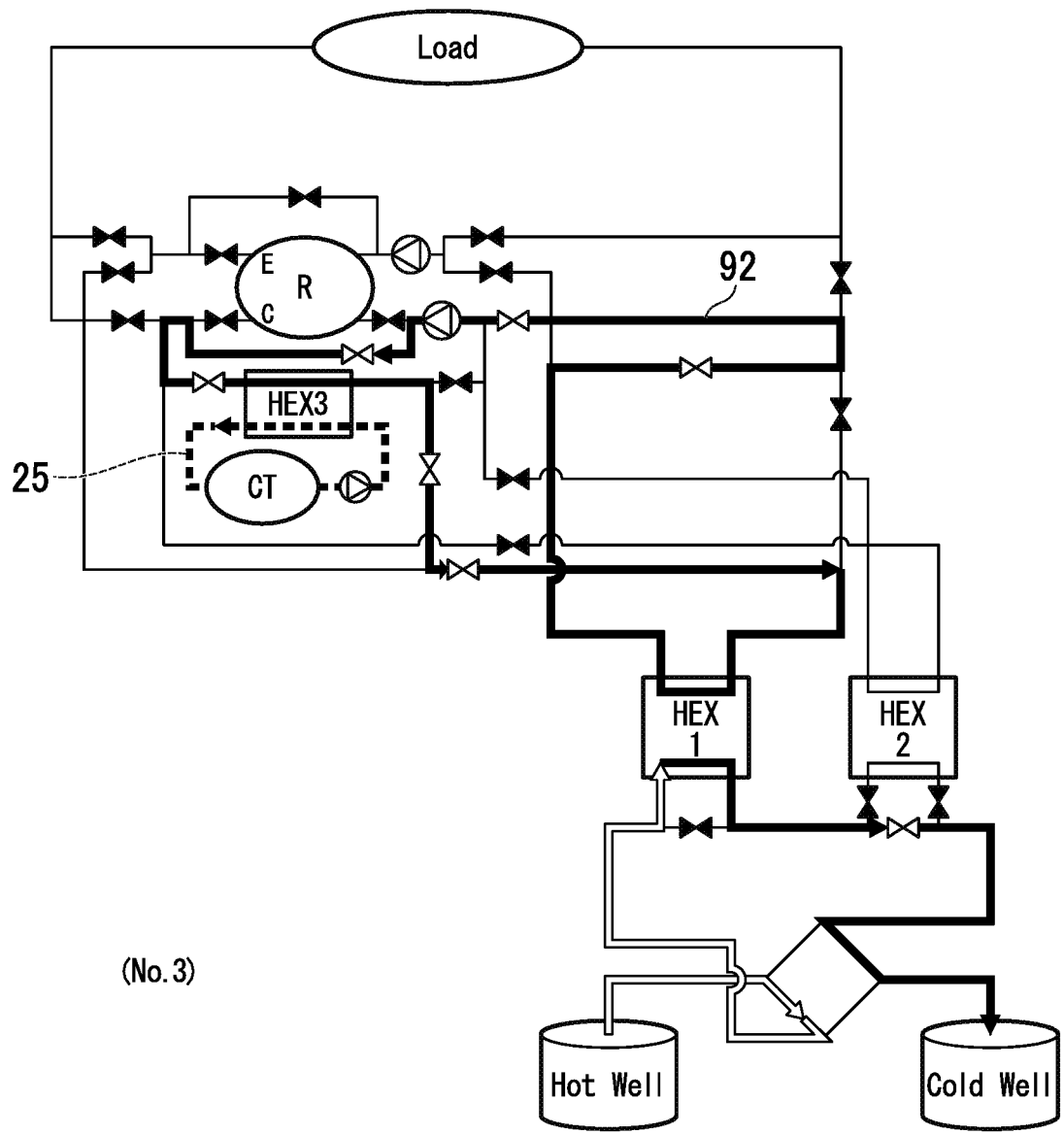
FIG. 5 is a diagram illustrating a circuit of a cooling tower heat storage mode (No. 3).

In this operation mode, the second auxiliary refrigerant circuit 92 is formed as illustrated in FIG. 5. Specifically, this is as follows.

When the cooling tower heat storage mode (No. 3) is selected, the central control unit 100 controls each opening and closing valve and each pump to form the second auxiliary refrigerant circuit 92 in this operation mode.

Regarding the second auxiliary refrigerant circuit 92, the central control unit 100 operates the pump 33 and opens the opening and closing valves 61, 66, 65, 70, 68, and 58 to form the second auxiliary refrigerant circuit 92 through which the refrigerant circulates. Accordingly, the refrigerant in the second auxiliary refrigerant circuit 92 in this operation mode circulates through the pump 33, the opening and closing valve 61, the opening and closing valve 66, the auxiliary heat exchanger 23, the opening and closing valve 65, the opening and closing valve 70, the upstream heat exchanger 21, the opening and closing valve 68, the opening and closing valve 58, and the pump 33 in this order.

Regarding the cooling tower 24, the central control unit 100 operates the cooling tower 24 and the pump 34.

Regarding the heat source well facility 80, the central control unit 100 performs the same control as in the winter heating+cold water heat storage mode (No. 1).

Therefore, in the second auxiliary refrigerant circuit 92 in this operation mode, heat exchange can be performed between the cooling tower 24 and the well-side pipe 20.

In this operation mode, the central control unit 100 closes the opening and closing valves 51 to 57, 59, 60, 62 to 64, 67 and 69.

In the cold heat discharge operation mode, three types of operation modes of No. 4 to No. 6 are set for an operation pattern for discharging cold heat in the heat source well facility 80. Selection between the three types of operation modes is based on the fact that the three factors "use temperature difference", "integrated amount of heat", and "flow rate of groundwater" are balanced and an environmental impact is minimized even in a long-term operation.

A function and a control of each operation mode of the cold heat discharge operation will be described below.

(No. 4: Summer Heat Source Water Use Mode)

The summer heat source water use mode is a basic operation mode at the time of cooling of the load 16 mainly in summer.

In this operation mode, the cold heat required for the load 16 is obtained from the cold water well 12 via the heat source device 13 and the primary refrigerant circuit 14'. In this operation mode, the pumped water from the cold water well 12 is utilized for cooling the primary refrigerant circuit 14', and the cold heat obtained via the primary refrigerant circuit 14' and the heat source device 13 is supplied to the load 16.

This operation mode is an operation mode that is used when the pumped water from the cold water well 12 is at a high temperature which is not suitable for a summer heat source water+cold water precooling mode (No. 5) or a direct use in summer+serial follow-up mode (No. 6) to be described below.

Figure 6:
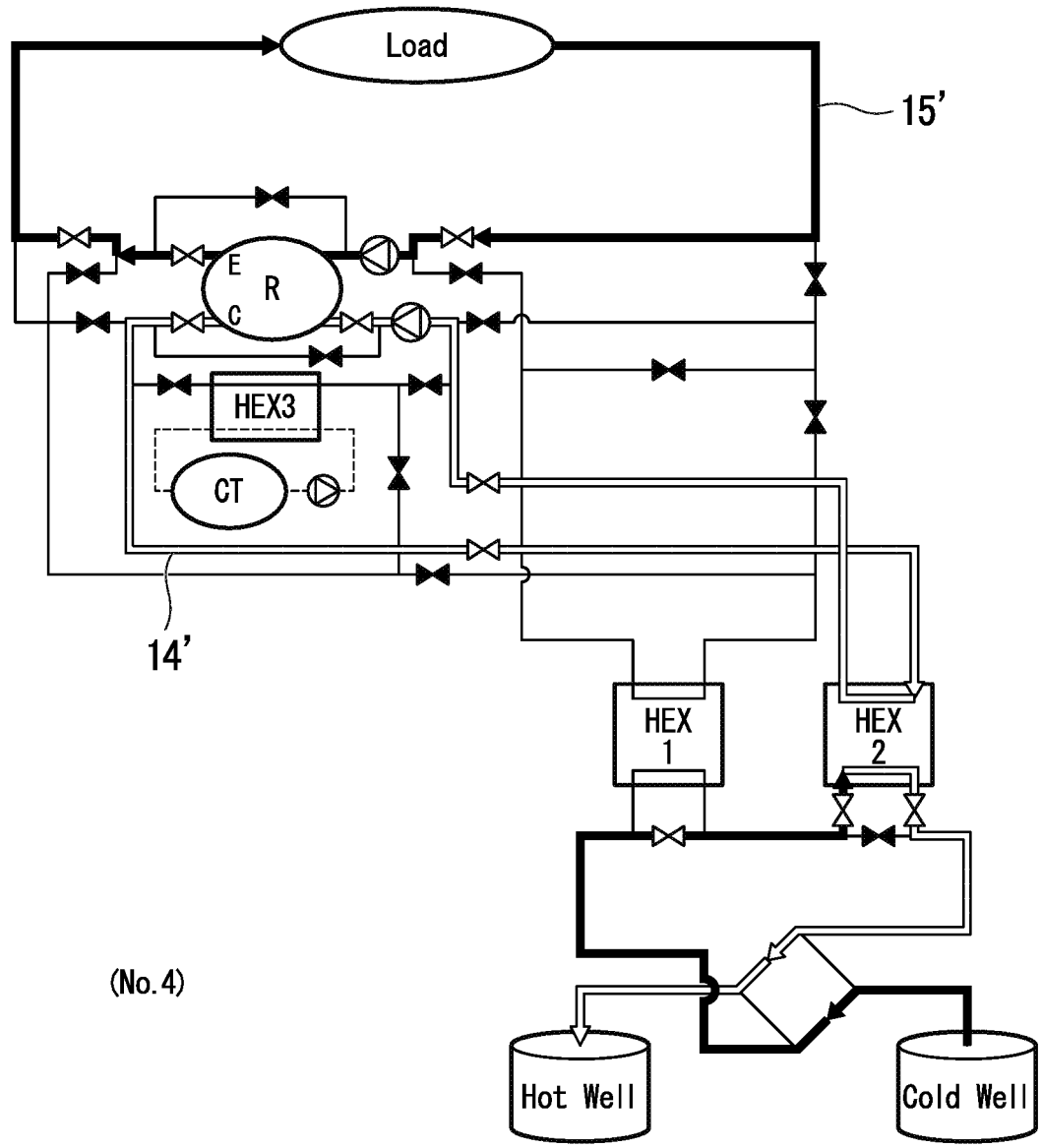
FIG. 6 illustrates a circuit of a summer heat source water use mode (No. 4).

In this operation mode, the primary refrigerant circuit 14' and the secondary refrigerant circuit 15' are formed, as illustrated in FIG. 6. Specifically, this is as follows.

When the summer heat source water use mode (No. 4) is selected, the central control unit 100 controls each opening and closing valve and each pump to form the primary refrigerant circuit 14' and the secondary refrigerant circuit 15' in this operation mode. The central control unit 100 operates the heat source device 13.

Regarding the primary refrigerant circuit 14', the central control unit 100 operates the pump 33 and opens the opening and closing valves 59, 60, 67, and 63 to form the primary refrigerant circuit 14' through which the refrigerant circulates. Accordingly, the refrigerant in the primary refrigerant circuit 14' in this operation mode circulates through the pump 33, the opening and closing valve 59, the condenser C of the heat source device 13, the opening and closing valve 60, the opening and closing valve 67, the downstream heat exchanger 22, the opening and closing valve 63, and the pump 33 in this order.

Regarding the heat source well facility 80, the central control unit 100 opens the opening and closing valves 101, 103, and 104, closes the opening and closing valve 102, and performs control so that the pumped water of the cold water well 12 passes through the opening and closing valve 101 and the downstream heat exchanger 22 in this order and is injected into the hot water well 11.

Regarding the secondary refrigerant circuit 15', the central control unit 100 operates the pump 35 and opens the opening and closing valves 56, 54, and 52 to form the secondary refrigerant circuit 15' through which the refrigerant circulates. Accordingly, the refrigerant in the secondary refrigerant circuit 15' in this operation mode circulates through the pump 35, the evaporator E of the heat source device 13, the opening and closing valve 56, the opening and closing valve 54, the load 16, the opening and closing valve 52, and the pump 35 in this order.

Therefore, in the primary refrigerant circuit 14' in this operation mode, heat exchange can be performed between the condenser C of the heat source device 13 and the well-side pipe 20. Further, in the secondary refrigerant circuit 15' in this operation mode, heat exchange is performed between the evaporator E of the heat source device 13 and the load 16.

Note that in this operation mode, the central control unit 100 closes the opening and closing valves 51, 53, 55, 57, 58, 61, 62, 64 to 66, and 68 to 70.

(No. 5: Summer Heat Source Water+Cold Water Precooling Mode)

The summer heat source water+cold water precooling mode is an operation mode in which the secondary refrigerant that cools the load 16 is directly cooled by the pumped water of the cold water well 12 and then further cooled in a refrigeration cycle of the heat source device 13.

In this operation mode, the pumped water of the cold water well 12 and the returning secondary refrigerant (returned refrigerant) from the load 16 undergo heat exchange, and the cold heat of the secondary refrigerant after the heat exchange is directly supplied to the load 16 (direct use). When the load 16 cannot be sufficiently cooled with the secondary refrigerant after the heat exchange, the cold heat obtained by cooling the primary refrigerant circuit 14' with the pumped water of the cold water well 12 after the heat exchange is further supplied to the secondary refrigerant after the heat exchange (heat source water use).

When the secondary refrigerant can be sufficiently cooled by the first heat exchange (direct use), the operation (heat source water use) of the primary refrigerant circuit 14' is stopped. This operating state is referred to as "direct use".

When the secondary refrigerant cannot be sufficiently cooled by the first heat exchange (direct use), the operation of the primary refrigerant circuit 14' (heat source water use) is performed. This operation state is referred to as "combined use" of direct use and heat source water use.

Figure 7:
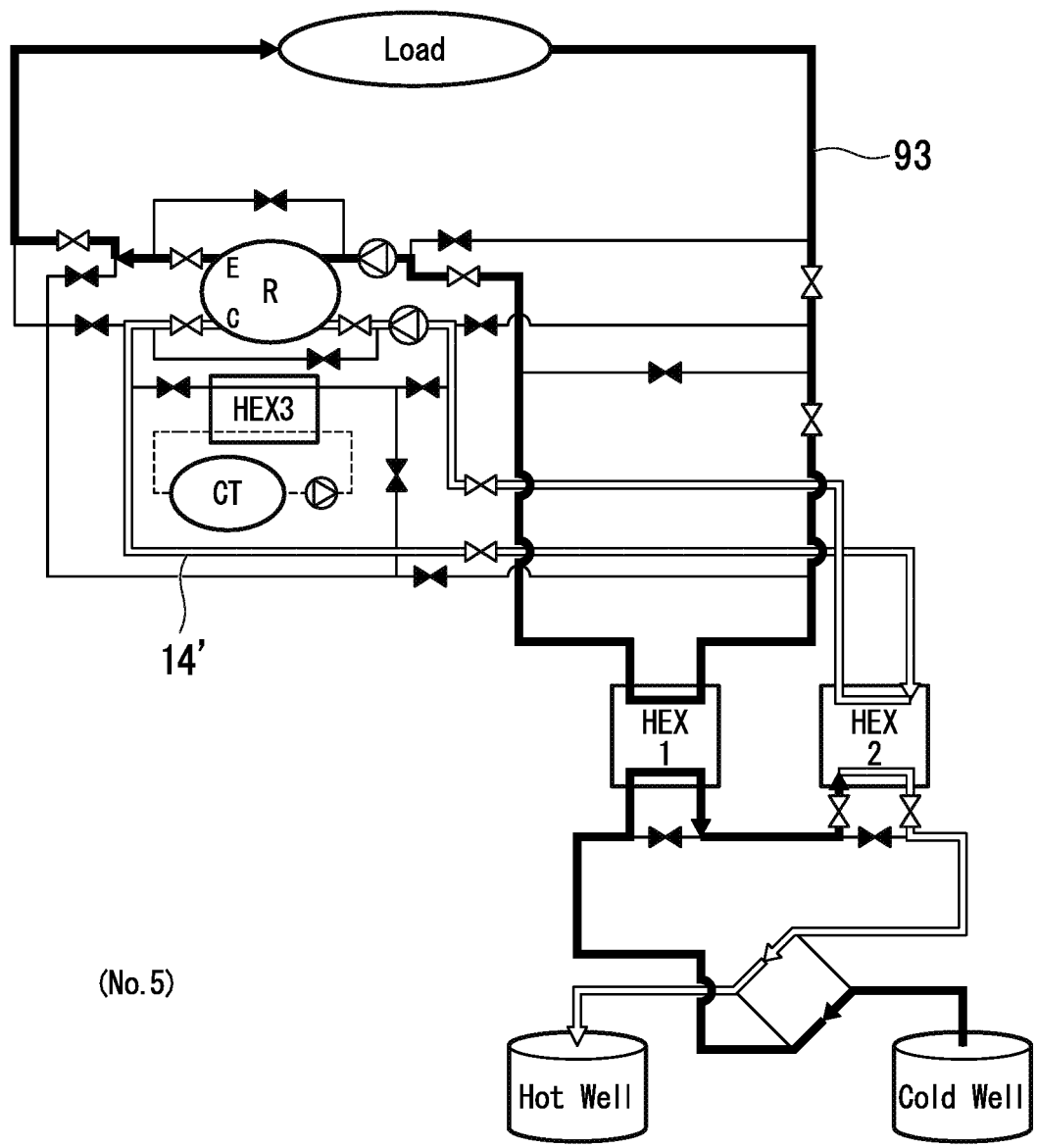
FIG. 7 is a diagram illustrating a circuit of summer heat source water+cold water precooling mode (No. 5).

In this operation mode, the primary refrigerant circuit 14' and the first expanded refrigerant circuit 93 are formed, as illustrated in FIG. 7. Specifically, this is as follows.

A case of "combined use" will be described.

When the summer heat source water+cold water precooling mode (No. 5, "combined use") is selected, the central control unit 100 controls each opening and closing valve and each pump to form the primary refrigerant circuit 14' and the first expanded refrigerant circuit 93 in this operation mode. The central control unit 100 operates the heat source device 13.

Regarding the first expanded refrigerant circuit 93, the central control unit 100 operates the pump 35 and opens the opening and closing valves 56, 54, 51, 69, and 53 to form the first expanded refrigerant circuit 93 through which the refrigerant circulates. Accordingly, the refrigerant in the first expanded refrigerant circuit 93 in this operation mode circulates through the pump 35, the evaporator E of the heat source device 13, the opening and closing valve 56, the opening and closing valve 54, the load 16, the opening and closing valve 51, the opening and closing valve 69, the upstream heat exchanger 21, the opening and closing valve 53, and the pump 35 in this order.

Regarding the primary refrigerant circuit 14', the central control unit 100 performs the same control as in the summer heat source water use mode (No. 4) described above to form the primary refrigerant circuit 14'.

Regarding the heat source well facility 80, the central control unit 100 closes the opening and closing valves 101 and 102, opens the opening and closing valves 103 and 104, and performs control so that pumped water of the cold water well 12 passes through the upstream heat exchanger 21 and the downstream heat exchanger 22 in this order and is injected into the hot water well 11.

Therefore, in the case of "combined use", in the primary refrigerant circuit 14' in this operation mode, heat exchange can be performed between the condenser C of the heat source device 13 and the well-side pipe 20. Further, in the first expanded refrigerant circuit 93 in this operation mode, heat exchange can be performed between the evaporator E of the heat source device 13, the load 16, and the well-side pipe 20 (the well-side pipe 20 upstream of a location of the heat exchange with the primary refrigerant circuit 14').

Note that in "combined use", the central control unit 100 closes the opening and closing valves 52, 55, 57, 58, 61, 62, 64 to 66, 68, and 70.

A case of "direct use" will be described.

When the summer heat source water+cold water precooling mode (No. 5, "direct use") is selected, the central control unit 100 controls each opening and closing valve and each pump to form the first expanded refrigerant circuit 93 in this operation mode.

Regarding the first expanded refrigerant circuit 93, the central control unit 100 performs the same control as the "combined use" to form the first expanded refrigerant circuit 93, and operates the pump 35.

The central control unit 100 does not form the primary refrigerant circuit 14' and does not operate the pump 33 and the heat source device 13. In this case, the refrigerant in the primary refrigerant circuit 14' flows and circulates in the heat source device 13 of which the operation is stopped.

Regarding the heat source well facility 80, the "combined use" may be left as it is (as in FIG. 7), but the central control unit 100 may close the opening and closing valves 101, 103, and 104, open the opening and closing valve 102, and perform control so that the pumped water of the cold water well 12 passes through the upstream heat exchanger 21 and the opening and closing valve 102 in this order and is injected into the hot water well 11.

Therefore, in the case of "direct use", in the first expanded refrigerant circuit 93, heat exchange can be performed between the load 16 and the well-side pipe 20.

Note that in "direct use", the central control unit 100 closes the opening and closing valves 52, 55, 57, 58, 61, 62, 64 to 66, 68, and 70. Further, the central control unit 100 closes the opening and closing valves 59, 60, 67, and 63.

As a modification example, in "direct use", the central control unit 100 may open the opening and closing valve 55 connected in parallel to the evaporator E of the heat source device 13. In this case, the refrigerant in the primary refrigerant circuit 14' circulates via the opening and closing valve 55.

(No. 6: Direct Use in Summer+Serial Follow-Up Mode)

In direct use in summer+serial follow-up mode, in a case where the load 16 cannot be sufficiently cooled with the cold water well 12 (in a case where a secondary required temperature is not satisfied), a follow-up operation using the refrigeration cycle of the heat source device 13 is performed.

In this operation mode, the pumped water of the cold water well 12 and the secondary refrigerant (returned refrigerant) returned from the load 16 undergo heat exchange, and the secondary refrigerant after the heat exchange is connected to the heat source device 13.

In this operation mode, the secondary refrigerant is cooled to a temperature equal to or lower than a temperature required for the load 16 (secondary required temperature) in the serial operation. The operation mode is an operation mode in which the operation can be performed with relatively simple automatic control since the control for cooling the secondary refrigerant such that it becomes equal to or lower than the secondary required temperature is performed using the temperature of the secondary refrigerant detected at an outlet of the heat source device 13. The input refrigerant temperature TE-005 detected by the upstream thermometer 45 may be used as the temperature of the secondary refrigerant detected at the outlet of the heat source device 13.

Further, the operation mode may be an operation mode in which the secondary refrigerant after heat exchange with the cold water well 12 is directly supplied to the load 16 without being cooled by the heat source device 13. The secondary refrigerant after the heat exchange with the cold water well 12 can operate when the temperature is equal to or lower than the secondary required temperature. In this case, since the heat source device 13, which is the main heat source, is stopped, a large reduction in the amount of power can be expected.

Figure 8:
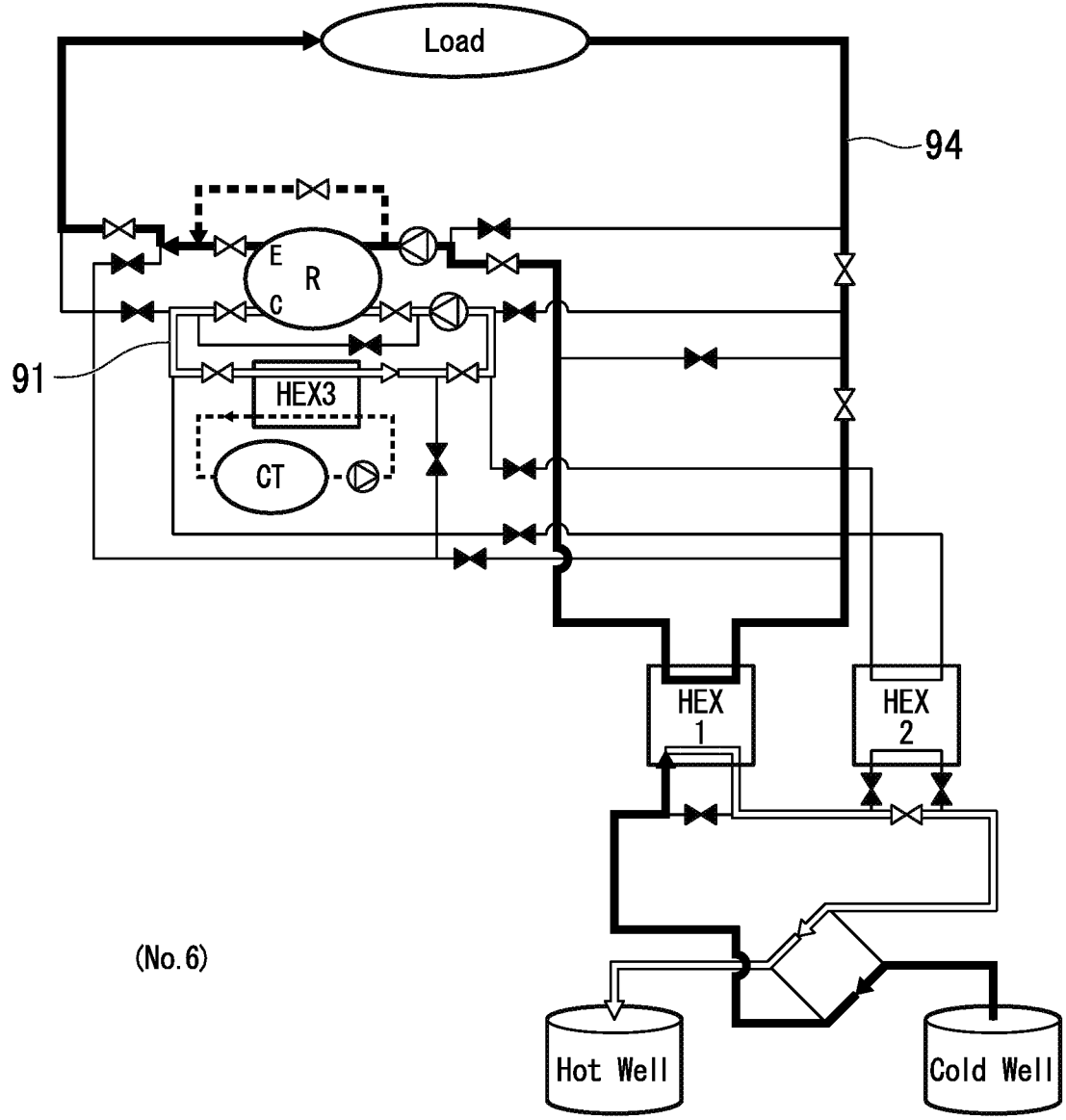
FIG. 8 is a diagram illustrating a circuit of direct use in summer+serial follow-up mode (No. 6).

In this operation mode, the first auxiliary refrigerant circuit 91 and the second expanded refrigerant circuit 94 are formed as illustrated in FIG. 8. Specifically, this is as follows.

When the direct use in summer+serial follow-up mode (No. 6) is selected, the central control unit 100 controls each opening and closing valve and each pump to form the first auxiliary refrigerant circuit 91 and the second expanded refrigerant Circuit 94 in this operation mode. The central control unit 100 operates the heat source device 13.

Regarding the first auxiliary refrigerant circuit 91, the central control unit 100 performs the same control as in the cold water heat storage mode (No. 2) described above to form the first auxiliary refrigerant circuit 91, and operates the pump 33.

Regarding the cooling tower 24, the central control unit 100 performs the same control as in the cold water heat storage mode (No. 2) described above, and operates the cooling tower 24 and the pump 34.

Regarding the heat source well facility 80, the central control unit 100 closes the opening and closing valves 101, 103, and 104, opens the opening and closing valve 102, and performs control so that the pumped water of the cold water well 12 passes through the upstream heat exchanger 21 and the opening and closing valve 102 in this order and is injected into the hot water well 11.

Regarding the second expanded refrigerant circuit 94, the central control unit 100 performs the same control as the control for forming the first expanded refrigerant circuit 93 in the summer heat source water+cold water precooling mode (No. 5) to form the second expanded refrigerant circuit 94. The central control unit 100 operates the pump 35.

Therefore, in the first auxiliary refrigerant circuit 91 in this operation mode, heat exchange can be performed between the condenser C of the heat source device 13 and the cooling tower 24. Further, in the second expanded refrigerant circuit 94 in this operation mode, heat exchange can be performed between the evaporator E of the heat source device 13, the load 16, and the well-side pipe 20.

The central control unit 100 closes the opening and closing valves 52, 53, 55, 57, 58, 61 to 63, 65, 67, 68, and 70.

However, as described above, when the operation of the heat source device 13 is stopped, the central control unit 100 may open the opening and closing valve 55 to form the second expanded refrigerant circuit 94 including a thick dotted path illustrated in FIG. 8.

(Method of Using Geothermal Heat)

A method of using geothermal heat will be described using the geothermal heat utilization system 10.

The central control unit 100 receives the temperature information detected by each thermometer, determines each operation mode using the mode determination unit 18, and controls each opening and closing valve, each pump, and the like using the mode switching unit 17. However, hereinafter, when the method of using geothermal heat can be performed, the user may switch the operation of each opening and closing valve or each device.

Hereinafter, referring back to FIG. 2, description will be given.

First, when the operation of the geothermal heat utilization system 10 is started, the cold heat storage operation mode or the cold heat discharge operation mode is selected as the operation mode (S1: operation mode selection step). The operation mode selection step S1 may be automatically selected by the central control unit 100 according to the season, the time period, the detected outside air temperature TE-004, or the like, or may be selected by the user. When the user selects the operation mode, the user inputs the selected operation mode (the cold heat storage operation mode or the cold heat discharge operation mode) to the central control unit 100.

When the cold heat storage operation mode is selected in the operation mode selection step S1, the geothermal heat utilization system 10 performs heating of the load 16 to select whether to store cold heat obtained from the load 16 in the ground (heat storage mode) (S2: heat storage mode selection step). The selection in the heat storage mode selection step S2 may also be automatically performed by the central control unit 100 according to the season, the time period, the detected outside air temperature TE-004, or the like, or may be performed by the user and input to the central control unit 100.

When the heat storage mode is selected in the heat storage mode selection step S2 (S2: YES), the mode determination unit 18 determines the operation mode to be implemented as winter heating+cold water heat storage mode (No. 1) through the selection between the central control unit 100 or the input of the user. The geothermal heat utilization system 10 implements the winter heating+cold water heat storage mode (No. 1) determined by the mode determination unit 18 (S3: winter heating+cold water heat storage mode implementing step). In this case, the central control unit 100 connects the primary refrigerant circuit 14 to the evaporator E of the heat source device 13 and connects the secondary refrigerant circuit 15 to the condenser C of the heat source device 13 as illustrated in FIG. 3 as described above in order to implement this mode (S4; cold heat storage operation mode switching step). The winter heating+cold water heat storage mode performing step S3 includes the cold heat storage operation mode switching step S4.

When the heat storage mode is not selected in the heat storage mode selection step S2 (S2: NO), the mode determination unit 18 compares the injected water temperature TE-002 with the outside air temperature TE-004, and determines whether the outside air temperature TE-004<injected water temperature TE-002 (S5: injected water-outside air comparison step).

When the mode determination unit 18 determines that the outside air temperature TE-004<injected water temperature TE-002 is not satisfied in the injected water-outside air comparison step S5 (S5: NO), the mode determination unit 18 determines the operation mode to be performed, to be the cold water heat storage mode (No. 2). The geothermal heat utilization system 10 performs the cold water heat storage mode (No. 2) determined by the mode determination unit 18 (S6: cooling tower heat storage mode performing step).

When the mode determination unit 18 determines that the outside air temperature TE-004<injected water temperature TE-002 in the injected water-outside air comparison step S5 (YES in S5), the mode determination unit 18 determines the operation mode to be performed, to be a cooling tower heat storage mode (No. 3). The geothermal heat utilization system 10 performs the cooling tower heat storage mode (No. 3) determined by the mode determination unit 18 (S7: cooling tower heat storage mode performing step).

When the cold heat discharge operation mode is selected in the operation mode selection step S1, the mode determination unit 18 compares the return refrigerant temperature TE-001 with the injected water temperature TE-002, and determines whether or not the return refrigerant temperature TE-001> the injected water temperature TE-002 (S8: refrigerant-outside air comparison step).

In the refrigerant-outside air comparison step S8, when the mode determination unit 18 determines that the returned refrigerant temperature TE-001> the injected water temperature TE-002 (S8: YES), the mode determination unit 18 determines that the operation mode to be performed is the direct use in summer+serial follow-up mode (No. 6). The geothermal heat utilization system 10 performs the direct use in summer+serial follow-up mode (No. 6) determined by the mode determination unit 18 (S9: direct use in summer+ serial follow-up mode performing step) is implemented by the geothermal heat utilization system 10.

When the mode determination unit 18 determines that returned refrigerant temperature TE-001> injected water temperature TE-002 is not satisfied in the refrigerant-outside air comparison step S8 (S8: NO), the mode determination unit 18 compares the returned refrigerant temperature TE-001 with the pumped water temperature TE-003 and determine whether or not return refrigerant temperature TE-001> pumped water temperature TE-003 (S10: refrigerant-pumped water comparison step).

When the mode determination unit 18 determines that returned refrigerant temperature TE-001> pumped water temperature TE-003 in the refrigerant-pumped water comparison step S10 (YES in S10), the mode determination unit 18 determines the operation mode to be performed, to be the summer heat source water+cold water precooling mode (No. 5). The geothermal heat utilization system 10 performs the summer heat source water+cold water precooling mode (No. 5) determined by the mode determination unit 18 (S11: summer heat source water+cold water precooling mode performing step).

When the mode determination unit 18 determines that returned refrigerant temperature TE-001> pumped water temperature TE-003 is not satisfied in the refrigerant-pumped water comparison step S10 (NO in S10), the mode determination unit 18 determines the operation mode to be performed, to be the summer heat source water use mode (No. 4). The geothermal heat utilization system 10 performs the summer heat source water use mode (No. 4) determined by the mode determination unit 18 (S12: summer heat source water use mode performing step). In this case, the central control unit 100 connects the primary refrigerant circuit 14' to the condenser C of the heat source device 13 and connects the secondary refrigerant circuit 15' to the evaporator E of the heat source device 13 as illustrated in FIG. 6 as described above in order to perform this mode (S13: cold heat discharge operation mode switching step). The summer heat source water use mode performing step S12 includes a cold heat discharge operation mode switching step S13.

When steps S3, S6, S7, S9, S11, and S12 are performed, the well facility control unit 27 controls the injected water temperature TE-002 as will be described below (S14: injected water temperature control step).

As illustrated in FIG. 2, the process returns to the operation mode selection step S1 again and the processes of S1 to S14 are similarly repeated.

When an end instruction is input to the geothermal heat utilization system 10 by the user, the repeated processes of S1 to S14 end and the operation ends.

(Injected Water Temperature Control)

The well facility control unit 27 performs injected water temperature control. Specifically, the well facility control unit 27 performs temperature instruction adjustment control (TIC control) for comparing the injected water temperature detected by the injected water thermometer 42 with a set injected water temperature and controlling an inverter frequency of the pump so that the injected water temperature becomes the set injected water temperature.

The injected water temperature control will be described in detail below.

In the case of the cold heat storage operation mode, the well facility control unit 27 transmits a command to the pump control unit 28 so that the injected water temperature becomes the set injected water temperature. For example, when the detected injected water temperature is higher than the set injected water temperature, the well facility control unit 27 transmits a command to the pump control unit 28 to reduce the output of the pump 32. The pump control unit 28 that has received the command decreases the inverter frequency of the pump 32 in order to reduce the output of the pump 32.

When the inverter frequency of the pump 32 is decreased, a flow rate of water in the well-side pipe 20 can be decreased. Therefore, the temperature of water in the well-side pipe 20 after cold heat is obtained through the heat exchange can be decreased as compared with before the flow rate of water is decreased.

Therefore, the well facility control unit 27 can control the injected water temperature of the water injected into the cold water well 12 such that it becomes low.

On the other hand, when the inverter frequency of the pump 32 is increased, the well facility control unit 27 can control the injected water temperature of the water injected into the hot water well 11 such that it becomes high.

In the cold heat discharge operation mode, the well facility control unit 27 transmits a command to the pump control unit 29 so that the injection temperature becomes the set injected water temperature. For example, when the detected injected water temperature is higher than the set injected water temperature, the well facility control unit 27 sends a command to the pump control unit 29 to increase the output of the pump 31. The pump control unit 29 that has received the command increases the inverter frequency of the pump 31 in order to increase the output of the pump 31.

When the inverter frequency of the pump 31 is increased, the flow rate of water in the well-side pipe 20 can be increased. Therefore, the temperature of water in the well-side pipe 20 after cold heat is discharged through the heat exchange can be decreased as compared with before the flow rate of water is increased.

Therefore, the well facility control unit 27 can control the injected water temperature of the water injected into the cold water well 11 to be low.

On the other hand, when the inverter frequency of the pump 31 is increased, the well facility control unit 27 can control the injected water temperature of the water injected into the hot water well 11 to be high.

Thus, the well facility control unit 27 can control the pump 31 or the pump 32 so that the injected water temperature becomes the set injected water temperature by transmitting a command to the pump control unit 28 or the pump control unit 29.

Operation and Effect of Embodiment

The geothermal heat utilization system 10 switches connection between the primary refrigerant circuit and the secondary refrigerant circuit and the heat source device in relation to the cold heat storage operation mode and the cold heat discharge operation mode. Therefore, the geothermal heat utilization system 10 can handle the cold heat storage operation mode and the cold heat discharge operation mode while using the same heat source device 13. Therefore, since the geothermal heat utilization system 10 can manage the balance in the amount of groundwater heat throughout the year with the balance in the heat amount in the heat source device 13, it is possible to simply manage the balance in the amount of heat of the groundwater throughout the year.

The geothermal heat utilization system 10 can perform cold heat storage using the cooling tower 24. Therefore, in the geothermal heat utilization system 10, a cold heat storage operation from the cooling tower 24 to the ground, in addition to the cold heat storage operation from the load 16 to the ground, is enabled in the cold heat storage operation mode. Further, the geothermal heat utilization system 10 can perform a follow-up operation using the cooling tower 24, in addition to the cold heat discharge operation using geothermal heat, in the cold heat discharge operation mode.

The geothermal heat utilization system 10 can discharge the exhaust heat of the primary refrigerant circuit 14 capable of heat exchange with the well-side pipe 20 to the cooling tower 24 by performing switching to the first auxiliary refrigerant circuit 91. Therefore, the geothermal heat utilization system 10 can perform a cold heat storage operation from the cooling tower 24 into the ground.

The geothermal heat utilization system 10 can supply the cold heat obtained from the cooling tower 24 to the well-side pipe 20 by performing switching to the second auxiliary refrigerant circuit 92. Therefore, the geothermal heat utilization system 10 can perform the cold heat storage operation from the cooling tower 24 into the ground. Further, in a case in which the outside air temperature TE-004 is lower than the injected water temperature TE-002, when switching to the second auxiliary refrigerant circuit 92 is performed, the geothermal heat utilization system 10 can efficiently perform the cold heat storage from the outside air into the ground.

The geothermal heat utilization system 10 performs heat exchange between the pumped water of the cold water well 12 and the returned refrigerant from the load 16 by performing switching to the first expanded refrigerant circuit 93. Therefore, the geothermal heat utilization system 10 can cool the returned refrigerant from the load 16 with the pumped water of the cold water well 12 before the returned refrigerant is cooled with the heat source device 13. Therefore, the geothermal heat utilization system 10 can directly use the cold heat of the pumped water of the cold water well 12. Further, even when the heat source device 13 is not used, the cold heat of the pumped water of the cold water well 12 can be directly used. Further, even in a case in which the returned refrigerant temperature TE-001 with respect to the load 16 is higher than the temperature of the pumped water TE-003, when switching to the first expanded refrigerant circuit 93 is performed, the geothermal heat utilization system 10 can efficiently use the cold heat of the pumped water of the cold water well 12 since switching is performed when the cold heat of the pumped water of the cold water well 12 can be directly used.

The geothermal heat utilization system 10 performs heat exchange between the pumped water of the cold water well 12 and the returned refrigerant from the load 16 by performing switching to the second expanded refrigerant circuit 94 and the first auxiliary refrigerant circuit 91. Therefore, the geothermal heat utilization system 10 can cool the returned refrigerant from the load 16 with the pumped water of the cold water well 12 before the returned refrigerant is cooled with the heat source device 13. Further, the geothermal heat utilization system 10 can cool the returned refrigerant from the load 16 through a cooling follow-up operation using the heat source device 13. Therefore, since the geothermal heat utilization system 10 can use direct cooling using pumped water of the cold water well 12 and follow-up cooling using the heat source device 13 in series, it is possible to cool the returned refrigerant from the load 16 to the temperature required for the load 16. Further, in a case in which the return refrigerant temperature TE-001 from the load 16 is higher than the injected water temperature TE-002, when switching to the second expanded refrigerant circuit 94 and the first supplemental refrigerant circuit 91 is performed, the geothermal heat utilization system 10 performs switching to the second expanded refrigerant circuit 94 and the first auxiliary refrigerant circuit 91 when a cooling follow-up operation using a heat source device is required. Therefore, the cooling follow-up operation using the heat source device 13 can be efficiently used.

Modification Example

Figure 9:
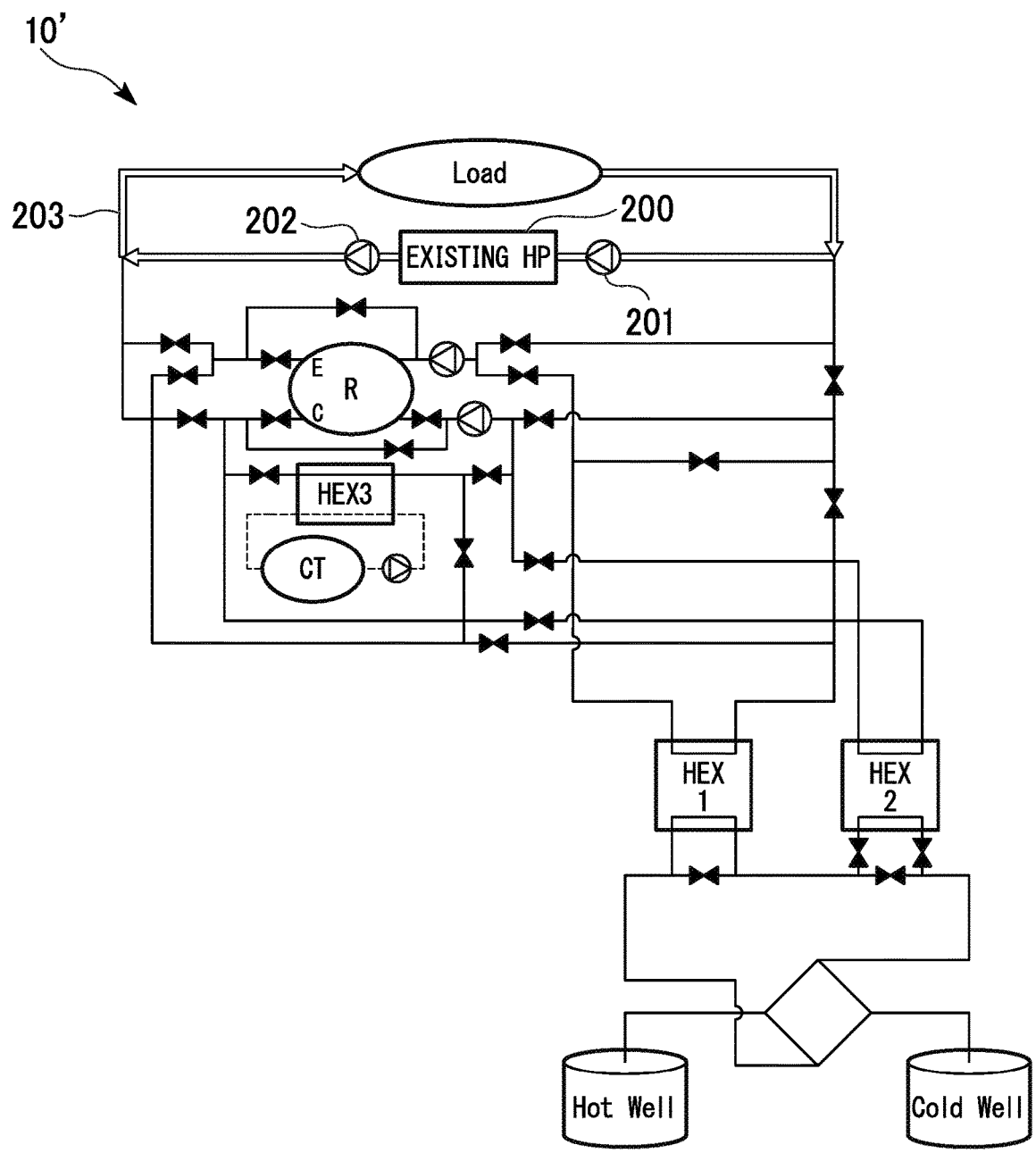
FIG. 9 is a diagram illustrating a circuit of a modification example of the geothermal heat utilization system in the embodiment of the present invention.
Figure 10:
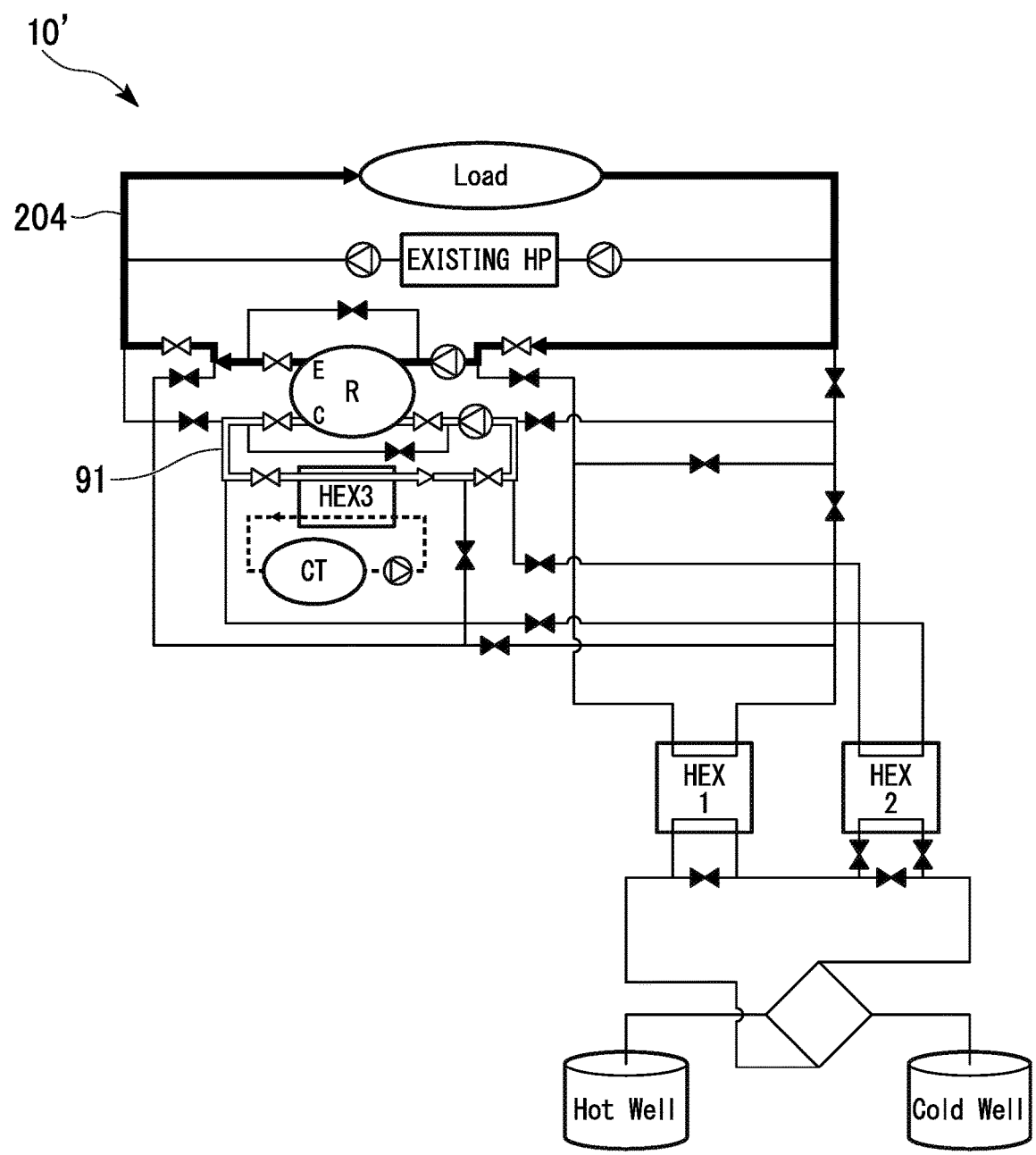
FIG. 10 is a diagram illustrating a circuit of a modification example of the geothermal heat utilization system in the embodiment of the present invention.

As a modification example, the geothermal heat utilization system 10 may be a geothermal heat utilization system 10' including an existing heat pump 200. The geothermal heat utilization system 10' performs a mode in which the circuit 203 passing through the pump 201, the heat pump 200, the pump 202, the load 16, and the pump 201 in this order is connected to the load 16 as illustrated in FIG. 9, in addition to the modes of No. 1 to No. 6. The geothermal heat utilization system 10' may additionally perform a mode in which the circuit 204 including the load 16, and the first auxiliary refrigerant circuit 91 are connected to the evaporator E of the heat source device 13 and the condenser C of the heat source device 13, as illustrated in FIG. 10.

(Cold Temperature Heat Balance Management)

Although the geothermal heat utilization system detects temperatures of the pumped water from the well, the water injected into the well, each circuit, and the outside air in the embodiment, the geothermal heat utilization system may detect flow rates of the pumped water from the well, the water injected into the well, and each circuit. Further, the geothermal heat utilization system may detect a temperature of an aquifer instead of the temperature of the pumped water from the well and the temperature of the water injected into the well. When each temperature and each flow rate can be recognized, the geothermal heat utilization system can calculate the balance in each amount of heat.

In a case in which the amount of heat use of the cooling load and the heating load is biased to either one, when the geothermal heat utilization system uses the geothermal heat, the ground may be excessively heated or cooled, and the geothermal heat may become depleted and no longer able to be used.

Therefore, the geothermal heat utilization system calculates an annual heat balance in the cold heat in the ground in order to prevent depletion of geothermal heat. For example, the geothermal heat utilization system can calculate the annual heat balance in the cold heat in the ground according to the balance between the amount of heat calculated from the temperature of the pumped water from the well and the flow rate of the pumped water and the calorific value calculated from the temperature of the water injected into the well and a flow of the injected water.

When the user plans a combination of various mode selections described above and causes the geothermal heat utilization system to so implement modes such that the annual heat balance in the cold heat is constant (ideally, so that the annual heat balance in the cold heat is zero) by monitoring the calculated annual heat balance in the cold heat in the ground, depletion of the geothermal heat in the geothermal heat utilization system can be prevented. Therefore, the geothermal heat utilization system can be operated and managed for a long period of time, and the influence on the environment can be minimized.

Further, the geothermal heat utilization system may control the flow rate of the pumped water from the well or the flow rate of the injected water by setting the set injected water temperature described above to the injected water temperature at the start of the operation. When the set injected water temperature is set to an injected water temperature at the start of operation, the geothermal heat utilization system can maintain the injected water temperature at the injected water temperature at the start of the operation, and excessive warming or excessive cooling in the ground can be prevented.

When depletion of geothermal heat is not a problem, the geothermal heat utilization system may maximize the amount of geothermal heat utilization and select an operation mode with high energy saving performance on the basis of a plan of the user. When the amount of geothermal heat utilization is maximized and an operation mode with high energy saving performance is selected, an energy saving system can be operated for a long time.

Since the geothermal heat utilization system can use stored heat during the day and night by combining the various mode selections described above, it is possible to cope with a restricted power supply and demand.

Further, the geothermal heat utilization system can set the temperature of the hot water well to be high on the basis of a plan of the user. When the set temperature of the hot water well is set to be high, the geothermal heat utilization system can increase the COP of the heat pump for heating.

Note that in each of the above-described embodiments, a program for realizing various functions of the central control unit 100 including the mode switching unit 17 and the mode determination unit 18 is recorded on a computer-readable recording medium, and various processes are performed by loading the program recorded on the recording medium to a computer system and executing the program. Here, various processes of each CPU described above are stored in a computer-readable recording medium in the form of a program, and the various processes described above are performed by the computer reading and executing this program. Further, the computer-readable recording medium refers to a magnetic disk, a magneto-optical disk, a CD-ROM, a DVD-ROM, a semiconductor memory, or the like. Further, this computer program may be distributed to a computer via a communication line, and the computer receiving the distribution may execute the program.

Although the embodiments of the present invention have been described in detail with reference to the drawings, specific configurations are not limited to the above embodiments, and design changes and the like within the scope not departing from the gist of the present invention are included.

According to one aspect described above, it is possible to easily manage the balance in the amount of heat of groundwater throughout the year.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Geothermal heat use system
10' Geothermal heat use system
11 Hot water well
12 Cold water well
13 Heat source device
14 Primary refrigerant circuit
14' Primary refrigerant circuit
15 Secondary refrigerant circuit
15' Secondary refrigerant circuit
16 Load
17 Mode switching unit
18 Mode determination unit
20 Well-side pipe
21 Upstream heat exchanger
22 Downstream heat exchanger
23 Auxiliary heat exchanger
24 Cooling tower
25 Cooling tower-side refrigerant circuit
27 Well facility control unit
28 Pump control unit
29: Pump control unit
31 to 35: Pump
41 Load downstream side thermometer
42 Injected water thermometer
43 Pumped water thermometer
44 Outside air thermometer
45 Load upstream side thermometer
51 to 70: Opening and closing valve
80 Heat source well facility
91 First auxiliary refrigerant circuit
92 Second auxiliary refrigerant circuit
93 First expanded refrigerant circuit
94 Second extended refrigerant circuit
100 Central control unit
101 to 104: Opening and closing valve
200 Heat pump
201 Pump 202 Pump
203 Circuit
204 Circuit
C: Condenser
CV1 Check valve
CV2 Check valve
CV3 Check valve
CV4 Check valve
E Evaporator
TE-001 Returned refrigerant temperature
TE-002 Injected water temperature
TE-003 Pumped water temperature
TE-004 Outside air temperature
TE-005 Input refrigerant temperature

What is claimed is:

1. A geothermal heat utilization system comprising:
a heat source well facility including a hot water well, a cold water well, a well-side pipe that connects the wells, and a pump provided in the well-side pipe;
a heat source device having a refrigeration cycle including a compression unit, a condenser, an expansion unit, and an evaporator;
a primary refrigerant circuit that is connected so as to pass through only a first unit out of the first unit and a second unit, the primary refrigerant circuit capable of performing heat exchange between the first unit and the well-side pipe by the first refrigerant circulated between the first unit and the well-side pipe, wherein the first unit is one of the condenser and the evaporator of the heat source device and the second unit is the other of the condenser and the evaporator of the heat source device;
a secondary refrigerant circuit that is connected so as to pass through only the second unit out of the first unit and the second unit, the secondary refrigerant circuit capable of performing heat exchange between the second unit and a load by the second refrigerant circulated between the second unit and the load;
a plurality of opening and closing valves; and
a mode switching unit that is connected to each valve of the plurality of opening and closing valves so as to be capable of transmitting a control signal to each valve and controls each valve so as to switch between a cold heat storage operation mode in which the primary refrigerant circuit is connected so as to pass through the evaporator and the secondary refrigerant circuit is connected so as to pass through the condenser and a cold heat discharge operation mode in which the primary refrigerant circuit is connected so as to pass through the condenser and the secondary refrigerant circuit is connected so as to pass through the evaporator.

2. The geothermal heat utilization system according to claim 1, further comprising a cooling tower, and a cooling tower-side refrigerant circuit connected so as to pass through the cooling tower.

3. The geothermal heat utilization system according to claim 2, wherein the mode switching unit controls each valve so as to switch the secondary refrigerant circuit to a first auxiliary refrigerant circuit in which heat exchange is able to be performed between the cooling tower-side refrigerant circuit and the condenser in the cold heat storage operation mode.

4. The geothermal heat utilization system according to claim 3, wherein the mode switching unit controls each valve so as to switch the primary refrigerant circuit and the secondary refrigerant circuit to a secondary auxiliary refrigerant circuit in which heat exchange is able to be performed between the cooling tower-side refrigerant circuit and the well-side pipe in the cold heat storage operation mode.

5. The geothermal heat utilization system according to claim 2, wherein the mode switching unit controls each valve so as to switch the primary refrigerant circuit and the secondary refrigerant circuit to a secondary auxiliary refrigerant circuit in which heat exchange is able to be performed between the cooling tower-side refrigerant circuit and the well-side pipe in the cold heat storage operation mode.

6. The geothermal heat utilization system according to claim 5, further comprising:
an injected water thermometer that is provided in the well-side pipe and detects a temperature of water injected into the cold water well;
an outside air thermometer that detects an outside air temperature; and
a mode determination unit that compares the outside air temperature with the injected water temperature and determines whether the outside air temperature is lower than the injected water temperature,
wherein when the mode determination unit determines that the outside air temperature is lower than the injected water temperature, the mode switching unit controls each valve so as to perform switching to the second auxiliary refrigerant circuit.

7. The geothermal heat utilization system according to claim 2, wherein:
in the cold heat discharge operation mode, the mode switching unit controls each valve so as to connect the secondary refrigerant circuit such that the secondary refrigerant circuit passes through the evaporator, and perform switching to a second expanded refrigerant circuit in which heat exchange is able to be performed between the evaporator, the load, and the well-side pipe, and
switch the primary refrigerant circuit to a first auxiliary refrigerant circuit in which heat exchange is able to be performed between the cooling tower-side refrigerant circuit and the condenser.

8. The geothermal heat utilization system according to claim 7, further comprising:
an injected water thermometer that is provided in the well-side pipe and detects a temperature of water injected into the hot water well;
a load downstream side thermometer that is provided downstream of the load and detects a returned refrigerant temperature of a refrigerant returning from the load; and
a mode determination unit that compares the returned refrigerant temperature with the injected water temperature and determines whether the returned refrigerant temperature is higher than the injected water temperature,
wherein the mode determination unit controls each valve so as to perform switching to the second expanded refrigerant circuit and performs switching to the first auxiliary refrigerant circuit when the mode determination unit determines that the returned refrigerant temperature is higher than the injected water temperature.

9. The geothermal heat utilization system according to claim 1, wherein the mode switching unit controls each valve so as to connect the secondary refrigerant circuit such that the secondary refrigerant circuit passes through the evaporator in the cold heat discharge operation mode, and perform switching to a first expanded refrigerant circuit in which heat exchange is able to be performed between the evaporator, the load, and the well-side pipe upstream of a location of heat exchange with the primary refrigerant circuit.

10. The geothermal heat utilization system according to claim 9, further comprising:
   a pumped water thermometer that is provided in the well-side pipe and detects a temperature of pumped water from the cold water well;
   a load downstream side thermometer that is provided downstream of the load and detects a temperature of a returned refrigerant from the load; and
   a mode determination unit that compares the return refrigerant temperature with the pumped water temperature and determines whether the returned refrigerant temperature is higher than the pumped water temperature,
   wherein the mode switching unit controls each valve so as to perform switching to the first expanded refrigerant circuit when the mode determination unit determines that the returned refrigerant temperature is higher than the pumped water temperature.

11. A geothermal heat utilization method for performing a method comprising the steps of:
   an operation mode selection step of selecting an operation mode of a geothermal heat utilization system as a cold heat storage operation mode or a cold heat discharge operation mode, the geothermal heat utilization system including a heat source well facility including a hot water well, a cold water well, a well-side pipe that connects the wells, and a pump provided in the well-side pipe, a heat source device having a refrigeration cycle including a compression unit, a condenser, an expansion unit, and an evaporator, a primary refrigerant circuit that is connected so as to pass through only a first unit out of the first unit and a second unit, the primary refrigerant circuit capable of performing heat exchange between the first unit and the well-side pipe by the first refrigerant circulated between the first unit and the well-sidepipe, wherein the first unit is one of the condenser and the evaporator of the heat source device and the second unit is the other of the condenser and the evaporator of the heat source device, a secondary refrigerant circuit that is connected so as to pass through only the second unit out of the first unit and the second unit, the secondary refrigerant circuit capable of performing heat exchange between the second unit and a load by the second refrigerant circulated between the second unit and the load;
   a cold heat storage operation mode switching step of connecting the primary refrigerant circuit so as to pass through the evaporator and connecting the secondary refrigerant circuit so as to pass through the condenser when the cold heat storage operation mode is selected; and
   a cold heat discharge operation mode switching step of connecting the primary refrigerant circuit so as to pass through the condenser and connecting the secondary refrigerant circuit so as to pass through the evaporator when the cold heat discharge operation mode is selected.

* * * * *